(12) United States Patent
Kakutani

(10) Patent No.: US 7,965,419 B2
(45) Date of Patent: Jun. 21, 2011

(54) IMAGE PROCESSING DEVICE AND PRINTING APPARATUS FOR PERFORMING BIDIRECTIONAL PRINTING

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 797 days.

(21) Appl. No.: 11/350,374

(22) Filed: Feb. 7, 2006

(65) Prior Publication Data

US 2006/0193010 A1 Aug. 31, 2006

(30) Foreign Application Priority Data

| Feb. 9, 2005 | (JP) | ................................. | 2005-032771 |
| Jun. 10, 2005 | (JP) | ................................. | 2005-171290 |
| Jul. 21, 2005 | (JP) | ................................. | 2005-210792 |

(51) Int. Cl.
*G06K 15/00* (2006.01)

(52) U.S. Cl. ...... 358/3.06; 358/1.9; 358/1.18; 358/3.03; 358/3.13; 358/3.19; 347/15; 347/19; 347/41; 382/162; 382/237

(58) Field of Classification Search .................... 347/15, 347/19, 41; 358/1.9, 1.18, 3.03–3.06, 3.13, 358/3.19; 382/162, 237

See application file for complete search history.

(56) References Cited

U.S. PATENT DOCUMENTS

| 6,031,627 | A | * | 2/2000 | Kakutani | ....................... | 358/1.9 |
| 6,257,143 | B1 | * | 7/2001 | Iwasaki et al. | ................. | 101/481 |
| 6,310,637 | B1 | | 10/2001 | Shimada et al. | | |
| 6,322,186 | B1 | * | 11/2001 | Shimizu et al. | .................. | 347/15 |
| 6,425,652 | B2 | | 7/2002 | Otsuki | | |
| 6,454,390 | B1 | * | 9/2002 | Takahashi et al. | ............... | 347/41 |
| 6,532,026 | B2 | * | 3/2003 | Takahashi et al. | ............... | 347/41 |
| 6,744,530 | B1 | * | 6/2004 | Someno et al. | .............. | 358/1.18 |
| 6,749,280 | B2 | * | 6/2004 | Shimizu et al. | .................. | 347/15 |
| 6,984,011 | B2 | * | 1/2006 | Shimada et al. | ................. | 347/19 |
| 7,050,194 | B1 | * | 5/2006 | Someno et al. | .................. | 358/1.9 |
| 7,151,619 | B2 | * | 12/2006 | Toyoda et al. | ................ | 358/3.13 |
| 7,152,947 | B2 | * | 12/2006 | Wu | .................... | 347/41 |
| 7,375,855 | B2 | * | 5/2008 | Kakutani | ..................... | 358/3.03 |

(Continued)

FOREIGN PATENT DOCUMENTS

EP 1 027 999 8/2000

(Continued)

OTHER PUBLICATIONS

Abstract of Japanese Patent Publication No. 07-081190, Pub. Date: Mar. 28, 1995, Patent Abstracts of Japan.

(Continued)

*Primary Examiner* — King Y Poon
*Assistant Examiner* — Dung D Tran
(74) *Attorney, Agent, or Firm* — Martine Penilla & Gencarella, LLP

(57) ABSTRACT

This invention provides a printing apparatus that performs printing on a print medium. The printing apparatus includes: a dot data generator that performs a halftone process on image data, wherein the print image is formed by mutually combining print pixels belonging to each of a plurality of pixel position groups for which a physical difference is assumed at a formation of dots by the print image generator, in a common print area, and the halftone process is configured to determine the status of dot formation on each of the print pixels on an assumption of the physical difference.

6 Claims, 21 Drawing Sheets

U.S. PATENT DOCUMENTS

| | | | |
|---|---|---|---|
| 7,407,248 B2* | 8/2008 | Hirano et al. | 347/15 |
| 7,517,038 B2* | 4/2009 | Otsuki | 347/14 |
| 7,690,750 B2* | 4/2010 | Kawatoko et al. | 347/19 |
| 2003/0067616 A1* | 4/2003 | Toyoda et al. | 358/1.9 |
| 2003/0179256 A1 | 9/2003 | Endo | |
| 2004/0001549 A1* | 1/2004 | Kakutani | 375/240.18 |
| 2004/0080555 A1 | 4/2004 | Otsuki et al. | |
| 2004/0156077 A1* | 8/2004 | Kakutani | 358/3.04 |

FOREIGN PATENT DOCUMENTS

| | | |
|---|---|---|
| EP | 1 120 261 | 8/2001 |
| JP | 07-081190 | 3/1995 |
| JP | 10-329381 | 12/1998 |
| JP | 11-048587 | 2/1999 |
| JP | 2001-232859 | 8/2001 |

OTHER PUBLICATIONS

Abstract of Japanese Patent Publication No. 10-329381, Pub. Date: Dec. 15, 1998, Patent Abstracts of Japan.

Abstract of Japanese Patent Publication No. 11-048587, Publication Date: Feb. 23, 1999, Patent Abstracts of Japan.

Abstract of Japanese Patent Publication No. 2001-232859, Publication Date: Aug. 28, 2001, Patent Abstracts of Japan.

* cited by examiner

| | 128 pixels | | | | | | | | | | | | | | | |
|---|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 |
| 123 | 33 | 127 | 181 | 83 | 155 | 105 | 140 | 30 | 150 | 119 | 182 | 40 | 89 | 220 | 163 | 44 |
| 219 | 91 | 237 | 22 | 121 | 198 | 61 | 188 | 111 | 215 | 3 | 98 | 201 | 140 | 10 | 95 | |
| 11 | 195 | 53 | 136 | 227 | 37 | 247 | 12 | 233 | 52 | 192 | 135 | 32 | 246 | 113 | 194 | |
| 99 | 144 | 107 | 184 | 68 | 172 | 97 | 151 | 77 | 173 | 84 | 237 | 123 | 61 | 167 | 46 | |
| 225 | 40 | 251 | 6 | 217 | 116 | 28 | 196 | 125 | 35 | 207 | 17 | 153 | 203 | 24 | | |
| 87 | 169 | 78 | 162 | 59 | 146 | 211 | 64 | 254 | 142 | 72 | 178 | 87 | 118 | 228 | | |
| 190 | 15 | 202 | 111 | 238 | 19 | 93 | 169 | 8 | 110 | 221 | 49 | 249 | 2 | 144 | | |
| 74 | 246 | 134 | 43 | 174 | 128 | 230 | 50 | 216 | 154 | 26 | 168 | 79 | 184 | | | |
| 176 | 30 | 98 | 219 | 86 | 34 | 139 | 195 | 101 | 56 | 241 | 127 | 213 | 37 | | | |
| 69 | 148 | 196 | 2 | 159 | 247 | 89 | 11 | 136 | 185 | 92 | 14 | 108 | | | | |
| 187 | 41 | 126 | 226 | 106 | 57 | 190 | 115 | 235 | 36 | 208 | 121 | 229 | | | | |
| 81 | 214 | 92 | 53 | 145 | 204 | 27 | 166 | 74 | 157 | 82 | 165 | 31 | | | | |
| 232 | 21 | 170 | 240 | 13 | 132 | 252 | 51 | 222 | 4 | 245 | 48 | | | | | |
| 130 | 155 | 55 | 115 | 183 | 78 | 122 | 196 | 102 | 180 | 65 | 173 | | | | | |
| 72 | 252 | 100 | 211 | 45 | 231 | 20 | 148 | 39 | 133 | 205 | | | | | | |
| 202 | 32 | 179 | 5 | 163 | 95 | 191 | 86 | 239 | 111 | 29 | | | | | | |
| 104 | 143 | 58 | 243 | 70 | 218 | 63 | 161 | 9 | 209 | | | | | | | |
| 64 | 236 | 129 | 110 | 151 | 25 | 199 | 49 | 172 | 68 | | | | | | | |
| 171 | 17 | 208 | 38 | 225 | 131 | 99 | 254 | 113 | | | | | | | | |
| 80 | 191 | 87 | 174 | 76 | 189 | 13 | 143 | | | | | | | | | |
| 247 | 35 | 152 | 2 | 248 | 55 | | | | | | | | | | | |
| 140 | 108 | 197 | 127 | 96 | | | | | | | | | | | | |
| 13 | 215 | 46 | 229 | | | | | | | | | | | | | |
| 164 | 90 | 180 | | | | | | | | | | | | | | |
| 52 | 253 | | | | | | | | | | | | | | | |
| 205 | | | | | | | | | | | | | | | | |

(64 pixels, vertical)

Fig.8
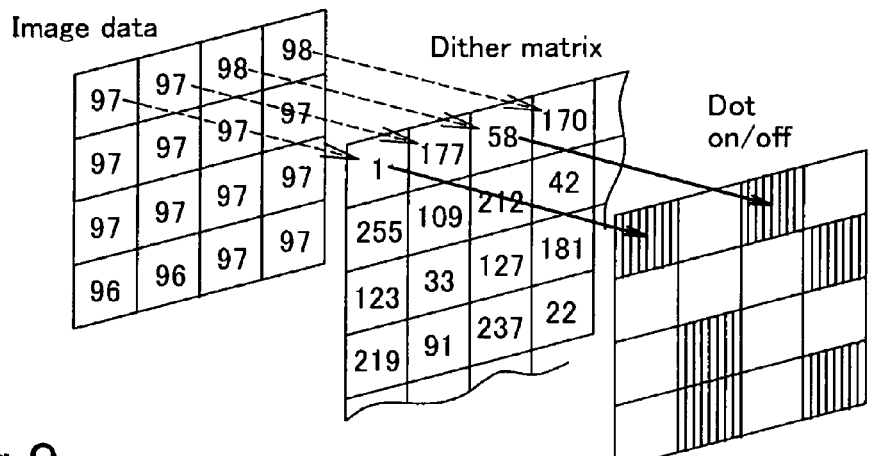
Fig.9
Overall dot distribution
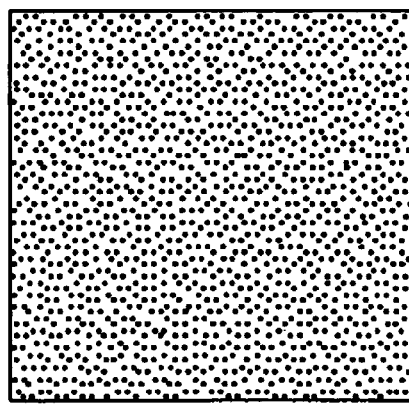
Dpall
Dots formed during forward scan     Dots formed during backward scan
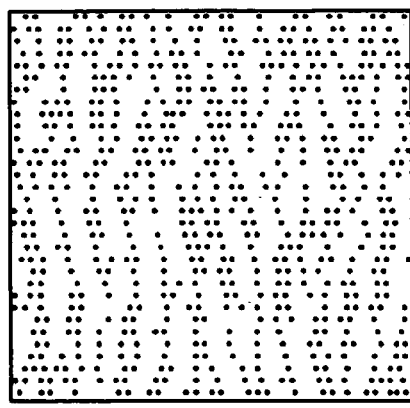
Dpaf
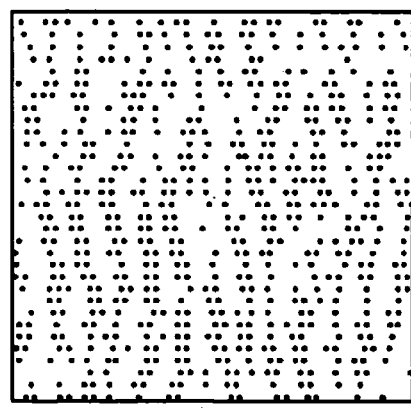
Ppb $$VTF(u) = 5.05 \cdot \exp\left(\frac{-0.138\pi L \cdot u}{180}\right)$$
$$\cdot \left\{1 - \exp\left(\frac{-0.1\pi L \cdot u}{180}\right)\right\}$$

$$\text{Granularity index} = K \int FS(u) \cdot VTF(u) \, du$$

Dot formation density for small dots (%)

Dot formation density for small dots (%)

Fig.15
Without dot position misalignment
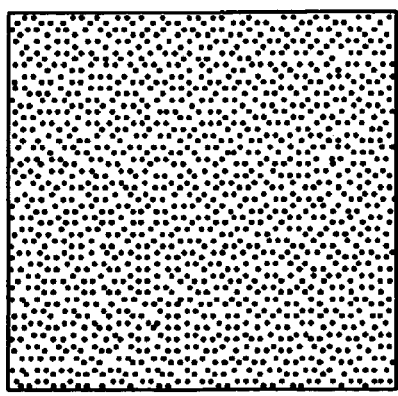
Dar
With dot position misalignment
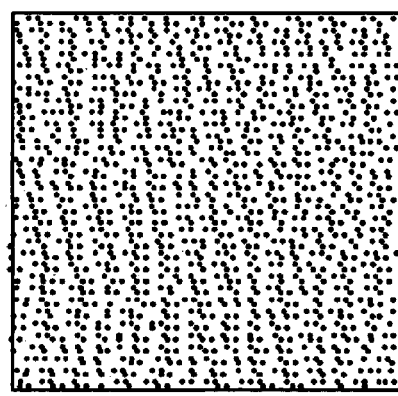
Dmar
Forward scan image
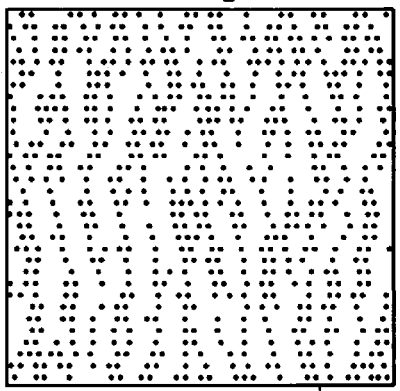
Fsir
Backward scan image
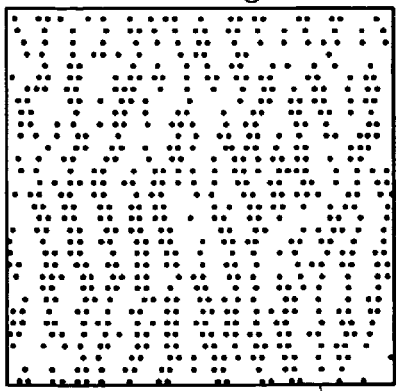
Bsir

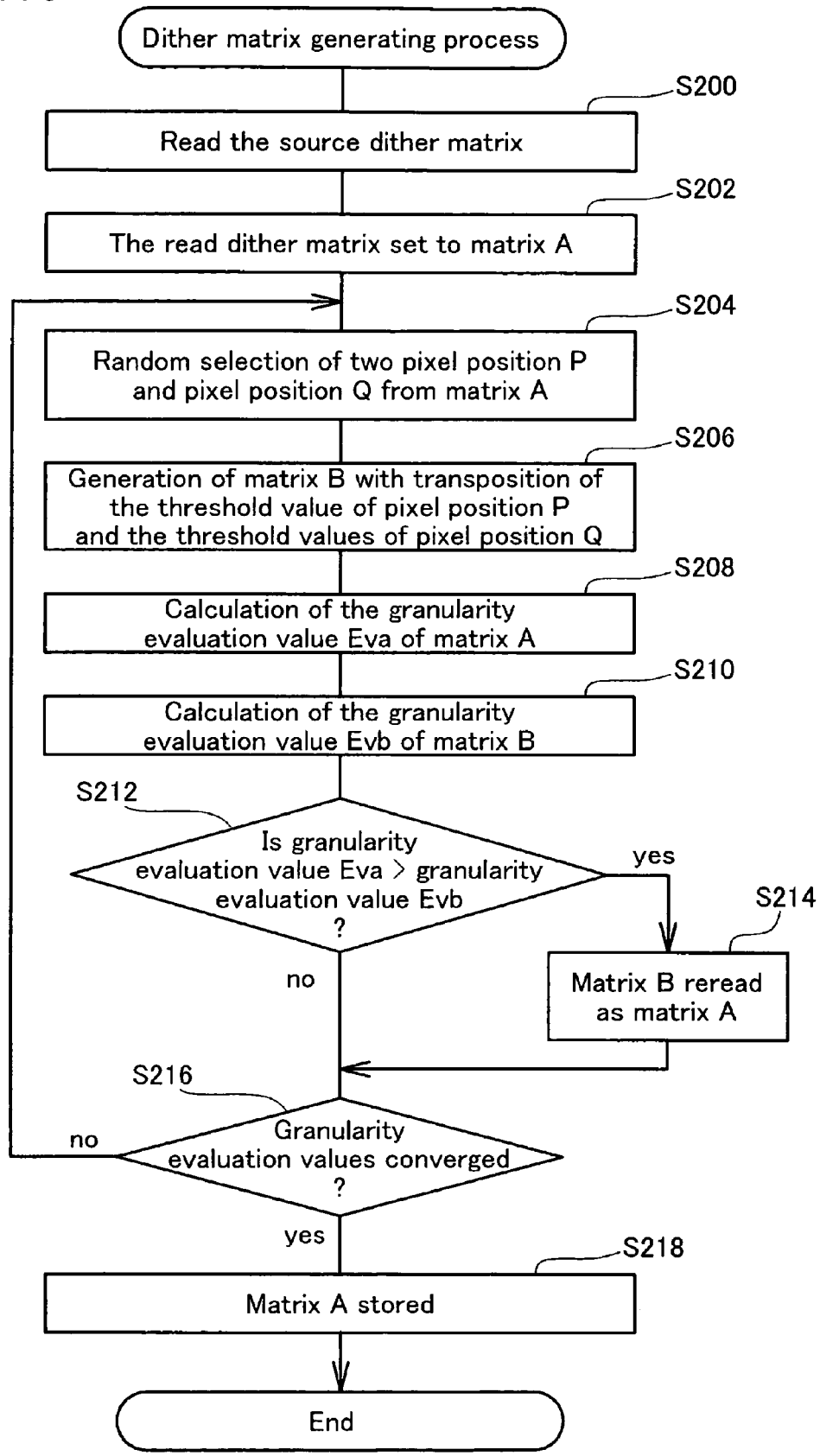

Fourth Variation Example

Fig.22(A)

|   | 1 | 2 | 3 | 4 | 5 | 6 |
|---|---|---|---|---|---|---|
| 1 | Forward | Forward | Forward | Forward | Forward | Forward |
| 2 | Backward | Backward | Backward | Backward | Backward | Backward |
| 3 | Forward | Forward | Forward | Forward | Forward | Forward |
| 4 | Backward | Backward | Backward | Backward | Backward | Backward |
| 5 | Forward | Forward | Forward | Forward | Forward | Forward |
| 6 | Backward | Backward | Backward | Backward | Backward | Backward |

Fig.22(B)

|   | 1 | 2 | 3 | 4 | 5 | 6 |
|---|---|---|---|---|---|---|
| 1 | Forward | Forward | Forward | Forward | Forward | Forward |
| 2 |  | Backward | Backward | Backward | Backward | Backward | Backward |
| 3 | Forward | Forward | Forward | Forward | Forward | Forward |
| 4 |  | Backward | Backward | Backward | Backward | Backward | Backward |
| 5 | Forward | Forward | Forward | Forward | Forward | Forward |
| 6 |  | Backward | Backward | Backward | Backward | Backward | Backward |

Fig.22(C)

|   | 1 | 2 | 3 | 4 | 5 | 6 |
|---|---|---|---|---|---|---|
| 1 |  | Forward | Forward | Forward | Forward | Forward | Forward |
| 2 | Backward | Backward | Backward | Backward | Backward |
| 3 |  | Forward | Forward | Forward | Forward | Forward | Forward |
| 4 | Backward | Backward | Backward | Backward | Backward |
| 5 |  | Forward | Forward | Forward | Forward | Forward | Forward |
| 6 | Backward | Backward | Backward | Backward | Backward |

Dot pattern formed with all four pixel groups — Dpall

Dot pattern formed with the first to third pixel groups — Dp3

Dot pattern formed with the first and second pixel groups — Dp2

Dot pattern formed with only the first pixel group — Dp1

IMAGE PROCESSING DEVICE AND PRINTING APPARATUS FOR PERFORMING BIDIRECTIONAL PRINTING

BACKGROUND OF THE INVENTION

1. Field of the Invention

This invention relates to technology for printing an image by forming dots on a print medium.

2. Description of the Related Art

As an output device for images created by a computer, images shot using a digital camera, or the like, printing apparatus that print images by forming dots on a print medium are widely used. These printing apparatus print images by forming dots on a print medium by driving the heads at a suitable timing while running the dot forming head back and forth over the print medium. Also, among the printing apparatus, there are items that form dots only during the forward scan of the dot forming head, but if dots are formed by driving the head during the backward scan in addition to the forward scan, it is possible to print images rapidly. In this way, a method of printing by forming dots during forward scan and backward scan is called bidirectional printing.

With a printing apparatus that performs bidirectional printing, when forming during forward scan and when forming during backward scan, it is necessary to make adjustments in advance of the dot forming timing so as not to have displacement occur for the dot formation positions. This is due to the following kind of reason. For example, if forming dots only during forward scan of the head, one reference position near the end part of the back and forth movement is set, and it is possible to have the dot formation start when the head passes through the reference position (or at a specified timing after passing the reference position). To print one image, it is necessary to have the dot forming head go back and forth a plurality of times, but if the dot formation starts from the same position each time during the forward scan, there is no displacement of the dot position even when forming with dividing of the back and forth movement into a plurality of times.

In comparison to this, when forming dots during the backward scan as well, so that the formed dots start being formed from exactly the end position of the dot line formed during forward scan, it is necessary to suitably adjust the timing of starting formation of dots during the backward scan each time. Of course, so that dots are formed from exactly the end of the dot row formed during forward scan, even if the timing of starting dot formation during the backward scan is adjusted, if there was a tiny difference in the head movement speed during the forward scan and the backward scan, there will be position misalignment between the dots formed during forward scan and the dots formed during backward scan. Because of this, when performing bidirectional printing, the demand for precision for the mechanism that moves the head back and forth becomes strict. Then, when sufficient precision cannot be secured, it becomes necessary to adjust the timing of starting dot formation during backward scan so that displacements of the dot positions do not show up easily. From this kind of reason, for the printing apparatus that perform bidirectional printing, there have been proposed various methods for the adjustment method, with incorporation of an exclusive adjustment mechanism for adjusting the relative timing of forming dots during forward scan and backward scan, and adjustment programs (e.g. Unexamined Patent No. 7-81190, Unexamined Patent No. 10-329381, and the like).

However, high precision is demanded for this kind of adjustment, so there is of course the problem that the adjustment mechanism and adjustment program become complex and large. Also, to perform bidirectional printing, because there is demand for high precision for the mechanism for moving the dot forming head, there is the problem that the head movement mechanism also tends to become complex and large. Because of this, even when the dot formation position is slightly displaced, by suppressing to a minimum the effect on image quality, there is demand to develop technology that will make it possible to try to simplify the dot formation position adjustment mechanism and the adjustment program, as well as the head movement mechanism. Furthermore, this kind of problem is caused not just by the displacement in the main scan direction for bidirectional printing, but also due to, for example, shifts in the dot formation position due to physical reasons including mechanical errors such as Sub-scan direction displacement or time errors such as displacement of the ink spray timing. Furthermore, it occurs not just due to dot formation position misalignment, but also to the displacement itself of the timing for forming the dots.

SUMMARY OF THE INVENTION

This invention was created to address the problems described above of the prior art, and its purpose is to provide technology making it possible to suppress to a minimum the effect on image quality due to a physical difference at the dot formation.

In order to attain the above and the other objects of the present invention, there is provided a printing apparatus that performs printing on a print medium. The printing apparatus comprises: a dot data generator that performs a halftone process on image data representing a tone value of each of the pixels constituting an original image to determine a status of dot formation on each of the print pixels of the print image to be formed on the print medium, for generating dot data representing the determined status of dot formation, and a print image generator that forms a dot on each of the print pixels for generating a print image according to the dot data. The print image is formed by mutually combining print pixels belonging to each of a plurality of pixel position groups for which a physical difference is assumed at a formation of dots by the print image generator, in a common print area. The halftone process is configured to determine the status of dot formation on each of the print pixels on an assumption of the physical difference.

According to the printing apparatus of this invention, for print pixels belonging to each of the plurality of pixel position groups for which physical differences are assumed, a halftone process is constituted such that the dot formation status on each of the print pixels for which this physical differences is assumed is decided, so degradation of image quality due to this kind of physical difference, such as a shift in the dot formation position or the occurrence of low frequency noise due to displacement of the dot formation timing, for example, can be suppressed.

The image quality degradation mechanism due to the organic relationship between this kind of physical difference and halftone processing is an insight first found by this inventor. Specifically, conventional halftone processing was constituted with a focus on the spatial frequency distribution of the print image, so, for example, if the relative positions of a plurality of pixel position groups mutually combined in a shared printing area shift as a single body due to a physical error of the printing apparatus, the relative positional relationship collapses, and there is excessive degradation of the image quality, which was first made clear this time.

Furthermore, the inventors discovered the following phenomenon. Specifically, when there is a low frequency dense state for the dots formed in a plurality of pixel position groups, when there is displacement of the dot formation timing, and overlapping with this the ink drops are sprayed, at positions where dot density is high, states occur such as agglomerations of ink drops, excessive sheen, or a bronzing phenomenon, and differences in the image occurs between those and positions at which the dot density is low. This image difference causes the problem of being easily recognized as image unevenness by the human visual sense.

For the printing apparatus noted above, the physical differences can include displacement of the timing of dot formation for each of the plurality of pixel position groups, or, the physical differences can include a shift in the relative position of the dots for each of the plurality of pixel position groups.

In this way, physical differences have a broad meaning, of not only errors in the mechanism of the printing apparatus of printing head position measurement errors or Sub-scan feed volume measurement errors, but also, for example, being the cause of main scan direction errors due to printing paper uplift and ink spray timing (time error) displacement or sequence.

Based on this kind of new finding, according to the invention of this application, for example with the various constitutions like those shown below, it is possible to suppress the degradation of image quality due to this kind of physical difference.

With the printing apparatus noted above, the halftone process can also be constituted such that any of the dot patterns formed on the print pixels belonging to each of the plurality of pixel position groups has specified characteristics.

In this way, if the dots formed on the print pixels belonging to each of the plurality of pixel position groups is made to have specified characteristics, in contrast to the conventional halftone processing that depends on the relative positional relationship of the plurality of pixel position groups, it is possible to constitute this as a halftone process with a high robustness to physical differences.

Note that the specified characteristics can be decided based on the granularity index (specifically, the index representing how easy it is for the dots to stand out), or to have them decided as described later based on the correlation coefficient of the spatial frequency distribution. Also, the specified characteristics do not absolutely have to be provided across all the tones reproduced by this halftone process, but can also be provided for part of the tones. Here, "part of the tones" is preferably the tones with a relatively low dot density. This is because tones with a relatively low dot density make it easier for the dots to stand out.

With the printing apparatus noted above, the halftone process can also be further constituted so that the print images which are assumed not to include a shift have the specified characteristics. By doing this, it is possible to further increase the robustness to shifts.

With the printing apparatus noted above, the halftone process can also be constituted so that both the print images when it is assumed they do not include the shift and the printing images when it is assumed they do include the shift have the specified characteristics.

By doing this, it is possible to exhibit a marked effect when it is possible to forecast a shift format.

With the printing apparatus noted above, the specified characteristics can be either one of blue noise characteristics or green noise characteristics.

With the printing apparatus noted above, it is possible to have it so that the print image generating unit has a printing head, and while performing the main scan of the printing head, generates a print image by forming dots on each of the print pixels according to dot data both during forward scan and backward scan of the printing head, and the plurality of pixel position groups includes a first pixel position group for which dots are formed during the forward scan of the printing head and a second pixel position group for which dots are formed during the backward scan of the printing head.

By doing this, it is possible to constitute the halftone process to have a high level of robustness to displacement in the main scan direction for bidirectional printing.

With the printing apparatus noted above, it is also possible to have it so that the print image generating unit has a printing head, and while repeating a main scan cycle of the printing head N times (N is an integer of 2 or more), generates a print image by forming dots on each of the print pixels according to the dot data, and the plurality of pixel position groups includes a plurality of pixel position groups divided according to the remainder from the numerical value representing the order of the Sub-scan direction of the main scan line divided by the aforementioned N.

By doing this, it is possible to constitute a halftone process with a high level of robustness to displacement in the Sub-scan direction for interlace printing which embeds the main scan with a plurality of cycles.

With the printing apparatus noted above, it is also possible to have it so that the print image generating unit has a plurality of printing heads, and while performing the main scan of the plurality of printing heads, generates a print image by forming dots on each of the print pixels according to the dot data, and the plurality of pixel position groups includes a plurality of pixel position groups in charge of the dot formation by each of the plurality of printing heads.

By doing this, for printing using a plurality of printing heads, it is possible to constitute a halftone process with a high level of robustness to displacement of the dot formation position between mutual printing heads, for example.

With the printing apparatus noted above, it is also possible to have it so that the print image generating unit has a plurality of printing heads, and while performing the Sub-scan of the print medium, generates a print image by forming dots on each of the print pixels according to the dot data, and the plurality of pixel position groups includes a plurality of pixel position groups in charge of the dot formation by each of the plurality of printing heads.

By doing this, it is possible to constitute the halftone process to have a high level of robustness suitable for a line printer that forms dots on each of the print pixels while performing the Sub-scan of the print medium.

With the printing apparatus noted above, it is also possible to have it so that the dot data generating unit has a dither matrix for which a threshold value is set for each pixel, and the presence or absence of dot formation for each of the print pixels is decided according to the tone value of each pixel that constitutes the original image and the threshold value set for the corresponding pixel position of the dither matrix, and the dither matrix is constituted so that each of the spatial frequency distributions of the threshold value set for the pixels belonging to each of the plurality of pixel position groups and the spatial frequency distributions of the print image have a mutually positive correlation coefficient, or the dot data generating unit has a dither matrix for which a threshold value is set for each pixel, and the presence or absence of dot formation for each of the print pixels is decided according to the tone value of each pixel that constitutes the original image and the threshold value set for the corresponding pixel position of the dither matrix, and the dither matrix is constituted so that each of the spatial frequency distributions of the threshold value set for the pixels belonging to each of the plurality of pixel position groups and the spatial frequency distributions of the print image have a mutual correlation coefficient of 0.7 or greater.

If this kind of dither matrix is used, a significant effect is not given to the spatial frequency distribution of the dots formed even when the physical differences described above occur, so it is possible to constitute a halftone process with a high level of robustness to the physical differences described above.

With the printing apparatus noted above, it is also possible to have it so that the halftone process is constituted so that each of the spatial frequency distributions of the dot pattern formed on the print pixels belonging to each of the plurality of pixel position groups and the spatial frequency distributions of the print image have a mutually positive correlation coefficient or the halftone process is constituted so that each of the spatial frequency distributions of the dot pattern formed on the print pixels belonging to each of the plurality of pixel position groups and the spatial frequency distributions of the print image have a mutual correlation coefficient of 0.7 or greater.

With this specification, "correlation coefficient" means the Pearson's product moment correlation coefficient generally used as a correlation coefficient. The Pearson's product moment correlation coefficient is one statistical index indicating the correlation (degree of similarity) between two data strings, and taking a real number value from −1 to 1, when close to 1, this means that there is a correlation between the two data strings, and when close to −1, it means there is a negative correlation. When close to 0, it means the correlation of the two data strings is weak. A correlation coefficient of 0.7 or greater generally means that the correlation is strong to a degree that cannot occur as a coincidental match.

The Pearson's product moment correlation coefficient is found by dividing the covariance of the two data strings by the product of the two data string standard deviation. That is to say, this can also be called the value normalized to from −1 to 1 by dividing the covariance of the two data strings by the product of the two data string standard deviation. With the invention of this application, the two data strings correlate to any two items selected from among a plurality of data strings for which the spatial frequency distribution of each dot pattern is digitized.

Note that the fact that when this invention is reliably mounted to a printing apparatus an effect is exhibited can be confirmed using a verification method for statistical engineering, for example. This verification method calculates the probability of a null hypothesis (this invention not mounted) occurring, and when that probability is low to a certain degree, it is judged that the null hypothesis is mistaken, and instead, a means of supporting an alternative hypothesis (this invention is mounted) is used to proceed. Here, the probability that is the criterion for judging that a null hypothesis is mistaken (significant level) is decided as a design quality assurance demand item. By doing this, it is possible to realize design quality assurance without performing confirming for all the tones or colors.

In specific terms, it is possible to perform design quality assurance of reliably mounting this invention on a printing apparatus using the kind of method described below and exhibiting an effect, for example.

(1) A sample of a specified number of gray tones for each pixel position group is printed using a printing apparatus that is subject to evaluation.

(2) The spatial frequency distribution is measured for each of the printed patterns.

(3) The mutual correlation coefficient between the measured plurality of spatial frequency distributions is found.

(4) It is confirmed that the correlation coefficient is positive or 0.7 or greater.

Here, the probability of a null hypothesis (this invention not mounted) occurring decreases as the number of gray tone samples increases.

Note that the correlation coefficient as a specified characteristic as described previously does not absolutely have to be provided across all the gradations reproduced by this halftone process, but can be provided for part of the gradations. Here, "part of the gradations" is preferably gradations for which the dot density is relatively low. This is because with gradations for which the dot density is relatively low, the dots stand out easily. In this kind of case, it is acceptable to confirm the correlation coefficient for consecutive gradations for which the dot density is relatively low, for example.

BRIEF DESCRIPTION OF THE DRAWINGS

FIG. 8 is an explanatory drawing conceptually showing the state of deciding the presence or absence of dot formation for each pixel while referencing the dither matrix;

FIG. 9 is an explanatory drawing showing the findings that became the beginning of the invention of this application;

FIG. 15 is an explanatory drawing showing the degradation of image quality due to presence or absence of dot position misalignment with images formed using a general dither matrix;

FIG. 16 is a flow chart showing the flow of the process of generating a dither matrix referenced with the tone number conversion process of this embodiment;

FIGS. 22(A), 22(B), and 22(C) are is an explanatory drawing showing an example of the actual printing status for the bidirectional printing method of the fourth variation example of the invention.

DESCRIPTION OF THE PREFERRED EMBODIMENT

Figure 1:
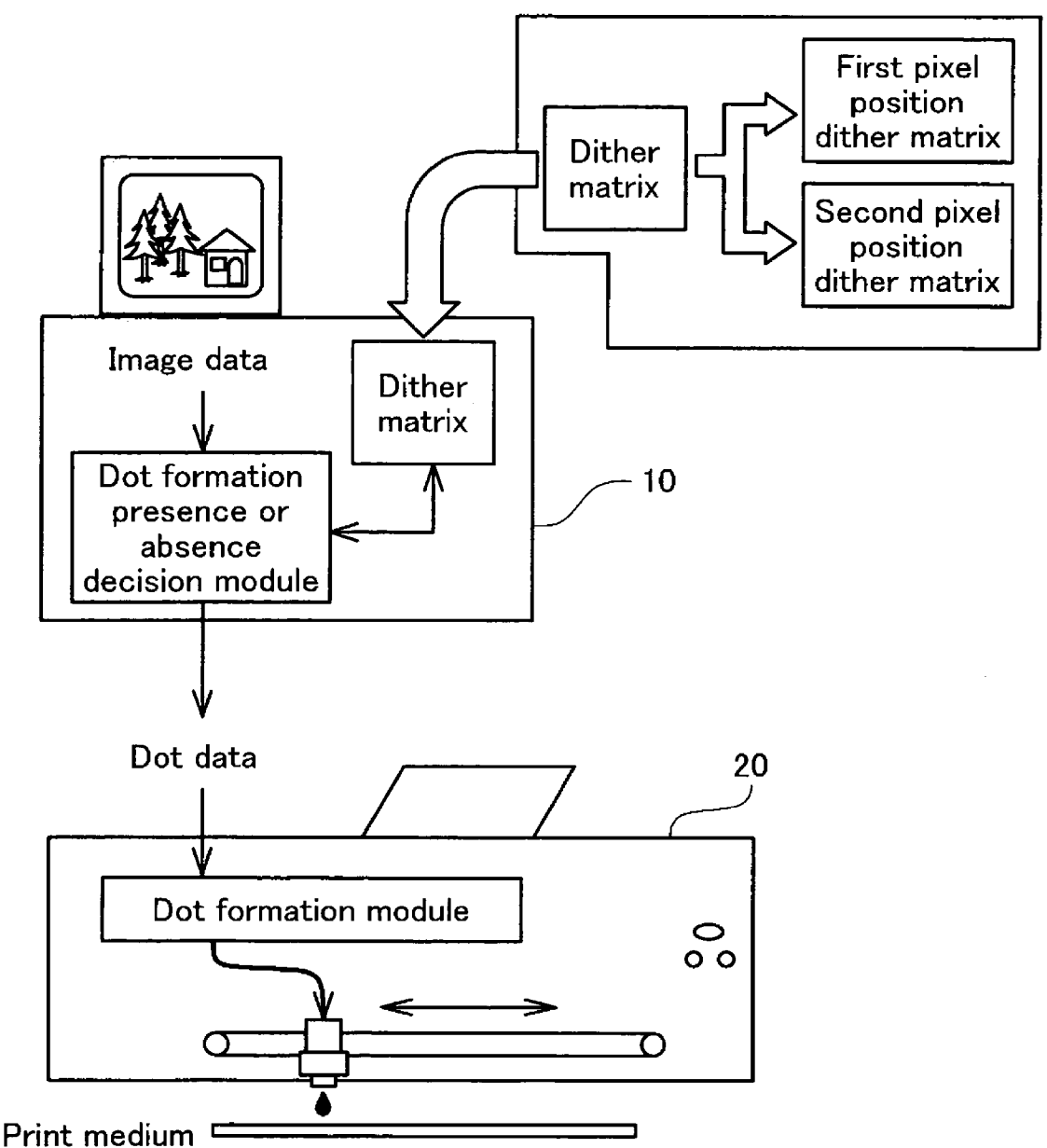
FIG. 1 is an explanatory drawing showing the summary of a printing system as the printing apparatus of this embodiment.

The present invention is explained in the following sequence based on embodiments.
A. Summary of the Embodiment:
B. Device Constitution:
C. Summary of the Image Printing Process:
D. Principle of Suppressing Degradation of Image Quality Due to Dot Position Misalignment:
E. Dither Matrix Generating Method:
F. Variation Examples:

A. Summary of the Embodiments:

Before starting the detailed description of the embodiment, a summary of the embodiment is described while referring to FIG. 1. FIG. 1 is an explanatory drawing showing a summary of a printing system as the printing apparatus of this embodiment. As shown in the drawing, the printing system consists of a computer 10 as the image processing device, a printer 20 that prints the actual images under the control of the computer 10 and the like, and entire system is unified as one and functions as a printing apparatus.

A dot formation presence or absence decision module and a dither matrix are provided in the computer 10, and when the dot formation presence or absence decision module receives image data of the image to be printed, while referencing the dither matrix, data (dot data) is generated that represents the presence or absence of dot formation for each pixel, and the obtained dot data is output toward the printer 20.

A dot formation head 21 that forms dots while moving back and forth over the print medium and a dot formation module that controls the dot formation at the dot formation head 21 are provided in the printer 20. When the dot formation module receives dot data output from the computer 10, dot data is supplied to the head to match the movement of the dot formation head 21 moving back and forth. As a result, the dot formation head 21 that moves back and forth over the print medium is driven at a suitable timing, forms dots at suitable positions on the print medium, and an image is printed.

Also, with the printing apparatus of this embodiment, by performing so called bidirectional printing for which dots are formed not only during forward scan of the dot formation head 21 but also during backward scan, it is possible to rapidly print images. It makes sense that when performing bidirectional printing, when dot formation position misalignment occurs between dots formed during forward scan and dots formed during backward scan, the image quality is degraded. In light of this, it is normal to have built into this kind of printer a special mechanism or control for adjusting at a high precision the timing of dot formation of one of the back and forth movements to the other timing, and this is one factor in causing printers to be larger or more complex.

Considering this kind of point, with the printing apparatus of this embodiment shown in FIG. 1, as the dither matrix referenced when generating dot data from the image data, a matrix having at least the following two characteristics is used. Specifically, as the first characteristic, this is a matrix for which it is possible to classify the dither matrix pixel positions into a first pixel position group and a second pixel position group. Here, the first pixel position and the second pixel position are pixel positions having a relationship whereby when one has dots formed at either the forward scan or the backward scan, the other has dots formed at the opposite. Then as the second characteristic, this is a matrix for which the dither matrix, a matrix for which the threshold values set for the first pixel positions are removed from the dither matrix (first pixel position matrix), and a matrix for which the threshold values set for the second pixel positions are removed (second pixel position matrix) all have blue noise characteristics.

Here, though the details are described later, the inventors of this application discovered the following kind of new findings. Specifically, there is a very strong correlation between the image quality of images for which the dot formation position was displaced between the forward scan and the backward scan and the image quality of images made only by dots formed during forward scan (images obtained with only the dots formed during the backward scan removed from the original image; hereafter called "forward scan images"), or the image quality of images made only by dots formed during backward scan (images obtained with only the dots formed during the forward scan removed from the original image; hereafter called "backward scan images"). Then, if the image quality of the forward scan images or the image quality of the backward scan images is improved, even when dot formation position misalignment occurs between the forward scan and the backward scan of bidirectional printing, it is possible to suppress degradation of image quality. Therefore, the dither matrix can be classified by the characteristics noted above, specifically, it is possible to classify as a first pixel position matrix and a second pixel position matrix, and if dot data is generated using a dither matrix such as one for which these three matrixes have blue noise characteristics, it is possible to have both the forward scan images and the backward images be good image quality images, so it is possible to suppress to a minimum the degradation of image quality even when there is dot formation position misalignment during bidirectional printing. As a result, when adjusting the dot formation timing of one of the back and forth movements to the other timing, there is no demand for high precision, so it is possible to have a simple mechanism and control for adjustment, and thus, it is possible to avoid the printer becoming large and complex. Following, this kind of embodiment is described in detail.

Figure 2:
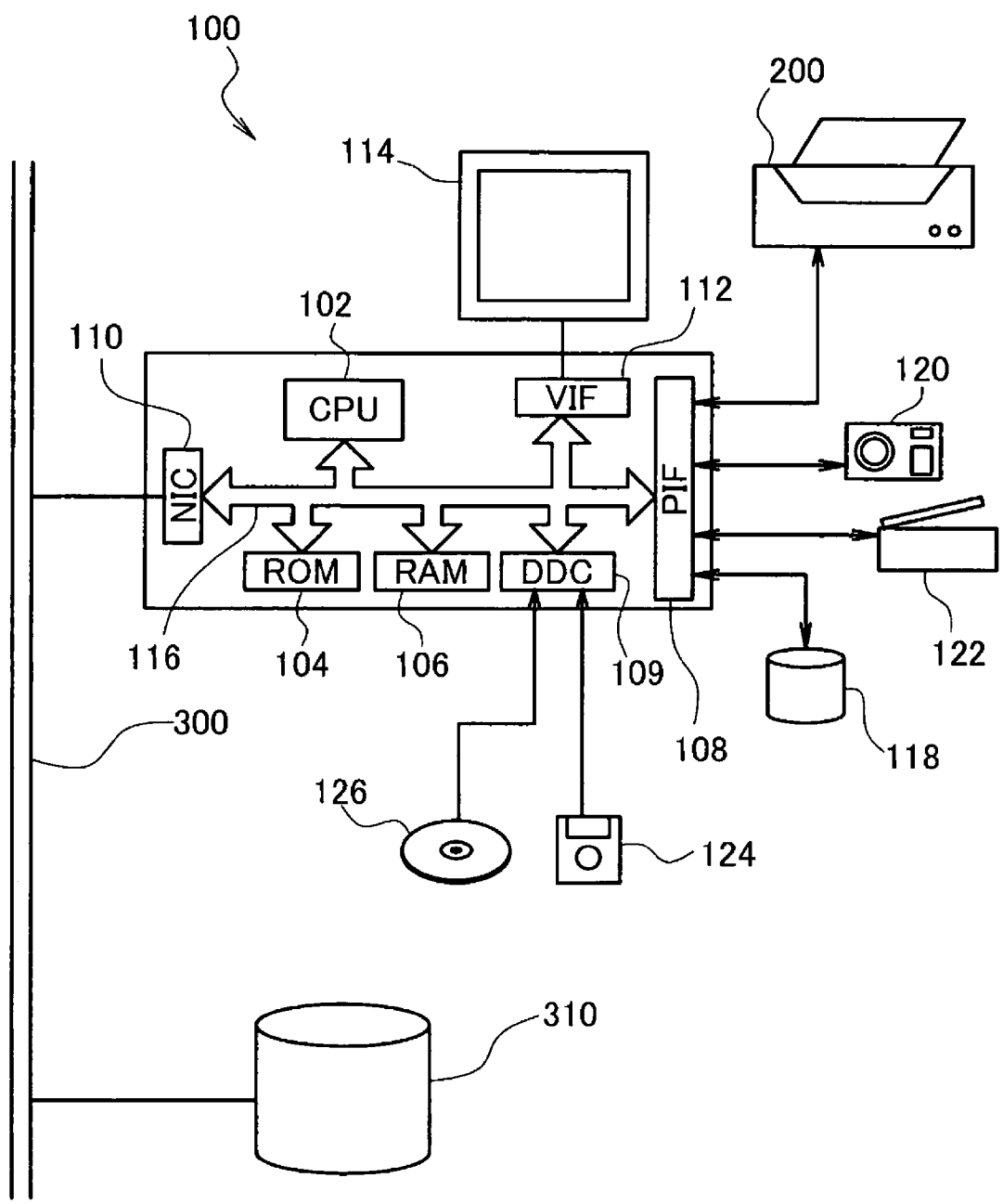
FIG. 2 is an explanatory drawing showing the constitution of a computer as the image processing device of this embodiment.

B. Device Constitution:

FIG. 2 is an explanatory drawing showing the constitution of the computer 100 as the image processing device of this embodiment. The computer 100 is a known computer constituted by a CPU 102 as the core, a ROM 104, a RAM 106 and the like being mutually connected by a bus 116.

Connected to the computer 100 are a disk controller DDC 109 for reading data of a flexible disk 124, a compact disk 126 or the like, a peripheral device interface PIF 108 for performing transmission of data with peripheral devices, a video interface VIF 112 for driving a CRT 113, and the like. Connected to the PIF 108 are a color printer 200 described later, a hard disk 118, or the like. Also, if a digital camera 120 or color scanner 122 or the like is connected to the PIF 108, it is possible to perform image processing on images taken by the digital camera 120 or the color scanner 122. Also, if a network interface card NIC 110 is mounted, the computer 100 is connected to the communication line 300, and it is possible to fetch data stored in the storage device 310 connected to the communication line. When the computer 100 fetches image data of the image to be printed, by performing the specified image processing described later, the image data is converted to data representing the presence or absence of dot formation for each pixel (dot data), and output to the color printer 200.

Figure 3:
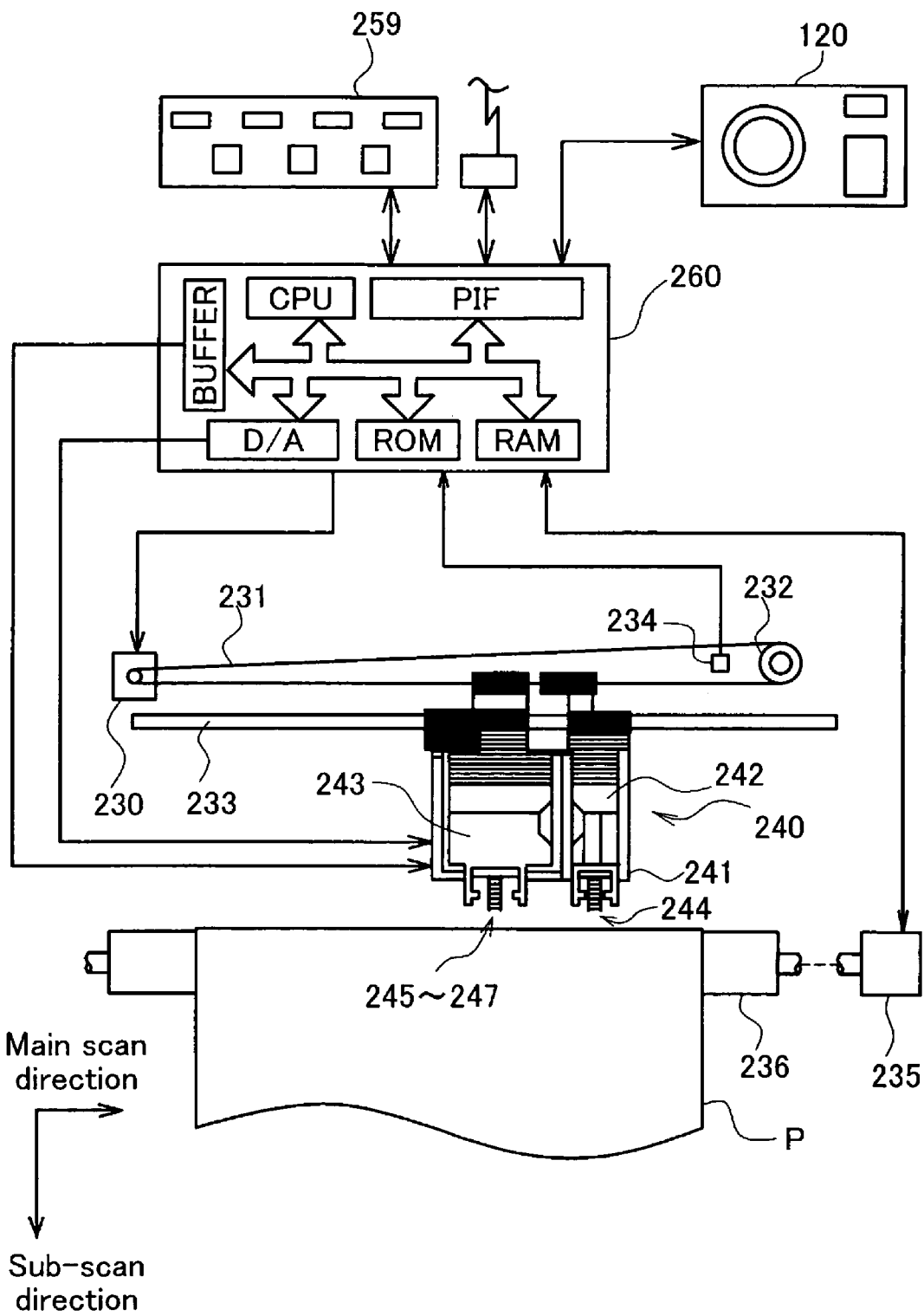
FIG. 3 is an explanatory drawing showing the schematic structure of the color printer of this embodiment.

FIG. 3 is an explanatory drawing showing the schematic structure of the color printer 200 of this embodiment. The color printer 200 is an ink jet printer capable of forming dots of four colors of ink including cyan, magenta, yellow, and black. Of course, in addition to these four colors of ink, it is also possible to use an inkjet printer capable of forming ink dots of a total of six colors including an ink with a low dye or pigment concentration of cyan (light cyan) and an ink with a low dye or pigment concentration of magenta (light magenta). Note that following, in some cases, cyan ink, magenta ink, yellow ink, black ink, light cyan ink, and light magenta ink are respectively called C ink, M ink, Y ink, K ink, LC ink, and LM ink.

As shown in the drawing, the color printer 200 consists of a mechanism that drives a printing head 241 built into a carriage 240 and performs blowing of ink and dot formation, a mechanism that moves this carriage 240 back and forth in the axial direction of a platen 236 by a carriage motor 230, a mechanism that transports printing paper P by a paper feed motor 235, a control circuit 260 that controls the dot formation, the movement of the carriage 240 and the transport of the printing paper, and the like.

Mounted on the carriage 240 are an ink cartridge 242 that holds K ink, and an ink cartridge 243 that holds each type of ink C ink, M ink, and Y ink. When the ink cartridges 242 and 243 are mounted on the carriage 240, each ink within the cartridge passes through an introduction tube that is not illustrated and is supplied to each color ink spray heads 244 to 247 provided on the bottom surface of the printing head 241.

Figure 4:
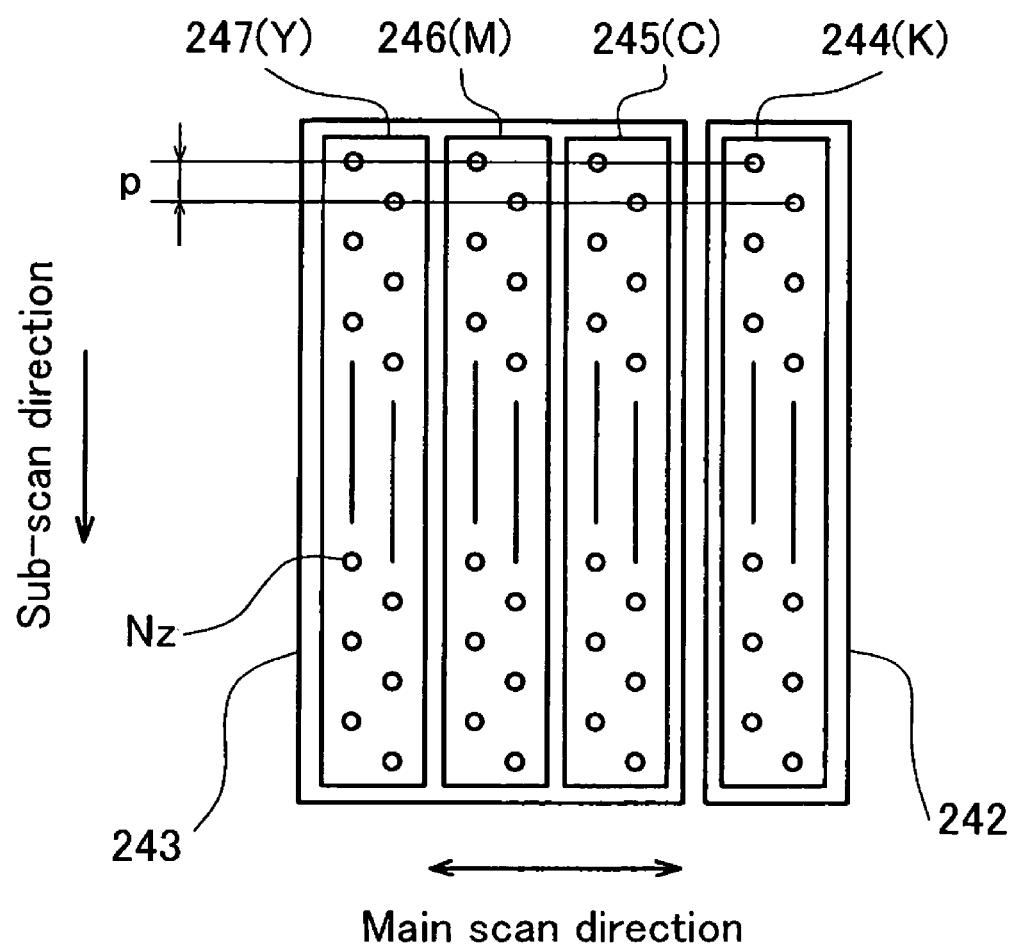
FIG. 4 is an explanatory drawing showing an array of inkjet nozzles for an ink spray head.

FIG. 4 is an explanatory drawing showing an array of inkjet nozzle Nz for the ink spray heads 244 to 247. As shown in the drawing, on the bottom surface of the ink spray heads are formed four sets of nozzle arrays that spray each color of ink C, M, Y, and K, and 48 nozzles Nz per one set of nozzle arrays are arranged at a fixed nozzle pitch k.

The control circuit 260 of the color printer 200 is constituted by a CPU, ROM, RAM, PIF (peripheral device interface), and the like mutually connected by a bus, and by controlling the operation of the carriage motor 230 and the paper feed motor 235, it controls the main scan movement and Sub-scan movement of the carriage 240. Also, when the dot data output from the computer 100 is received, by supplying dot data to the ink spray heads 244 to 247 to match the main scan or Sub-scan movement of the carriage 240, it is possible to drive these heads.

The color printer 200 having the kind of hardware constitution noted above, by driving the carriage motor 230, moves each color ink spray head 244 to 247 back and forth in the main scan direction, and by driving the paper feed motor 235, moves the printing paper P in the Sub-scan direction. The control circuit 260, by driving the nozzles at a suitable timing based on dot data to match the back and forth movement of the carriage 240 (main scan) and the paper feed movement of the print medium (Sub-scan), forms suitable colored ink dots at suitable positions on the print medium. By working in this way, the color printer 200 is able to print color images on the printing paper.

Note that though the printer of this embodiment was described as a so called inkjet printer that forms ink dots by spraying ink drops toward a print medium, it can also be a printer that forms dots using any method. For example, the invention of this application, instead of spraying ink drops, can also be suitably applied to a printer that forms dots by adhering each color of toner powder onto the print medium using static electricity, or a so called dot impact method printer.

Figure 5:
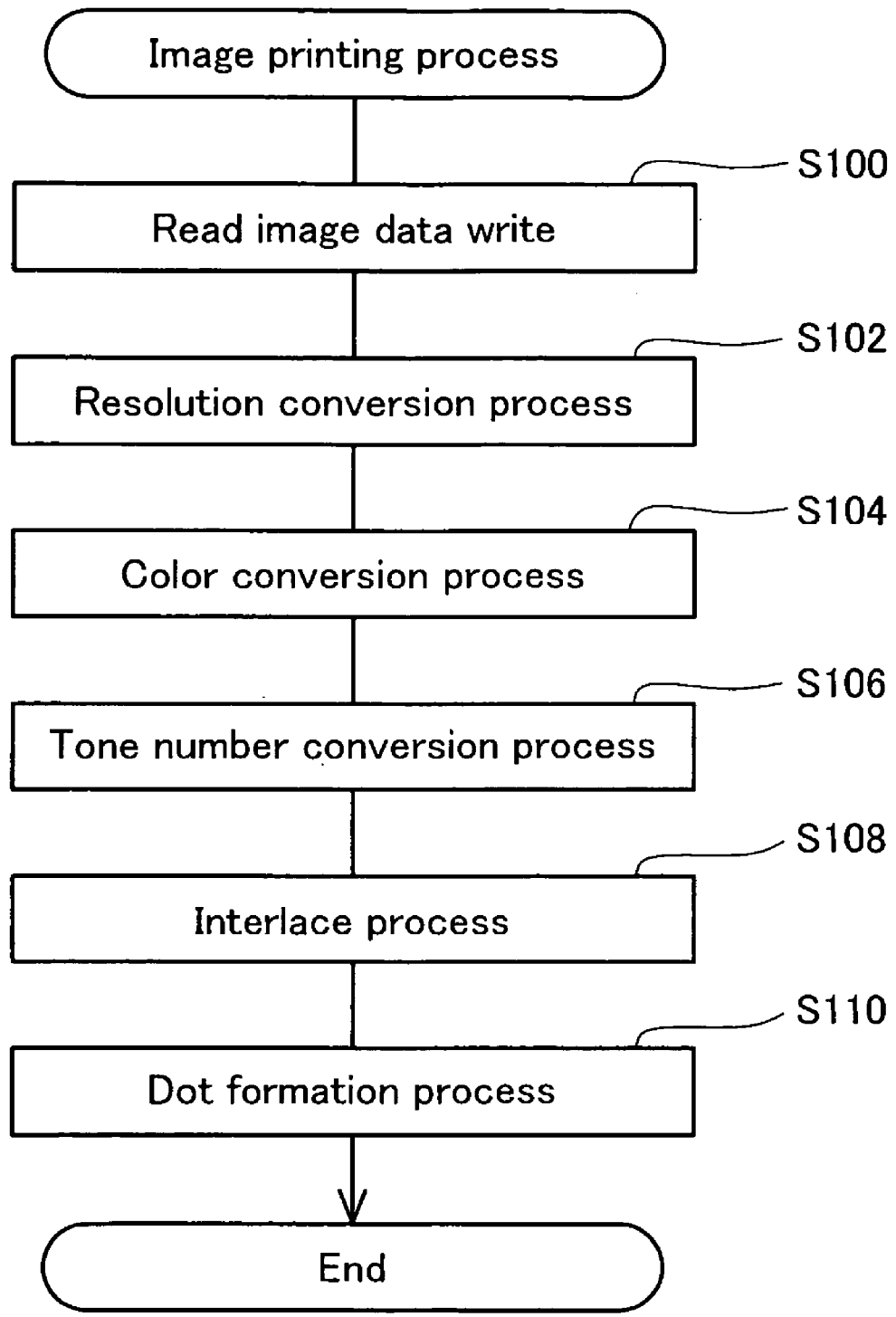
FIG. 5 is a flow chart showing the flow of the image printing process of this embodiment.

C. Summary of the Image Printing Process:

FIG. 5 is a flow chart showing the process flow of adding a specified image process by the computer 100 to an image to be printed, converting image data to dot data expressed by the presence or absence of dot formation, supplying to the color printer 200 as control data the obtained dot data, and printing the image.

When the computer 100 starts image processing, first, it starts reading the image data to be converted (step S100). Here, the image data is described as RGB color image data, but it is not limited to color image data, and it is also possible to apply this in the same way for black and white image data as well.

After reading of the image data, the resolution conversion process is started (step S102). The resolution conversion process is a process that converts the resolution of the read image data to resolution (printing resolution) at which the color printer 200 is to print the image. When the print resolution is higher than the image data resolution, an interpolation operation is performed and new image data is generated to increase the resolution. Conversely, when the image data resolution is higher than the printing resolution, the resolution is decreased by culling the read image data at a fixed rate. With the resolution conversion process, by performing this kind of operation on the read image data, the image data resolution is converted to the printing resolution.

Once the image data resolution is converted to the printing resolution in this way, next, color conversion processing is performed (step S104). Color conversion processing is a process of converting RGB color image data expressed by a combination of R, G, and B tone values to image data expressed by combinations of tone values of each color used for printing. As described previously, the color printer 200 prints images using four colors of ink C, M, Y, and K. In light of this, with the color conversion process of this embodiment, the image data expressed by each color RGB undergoes the process of conversion to data expressed by the tone values of each color C, M, Y, and K.

Figures 6, 7:
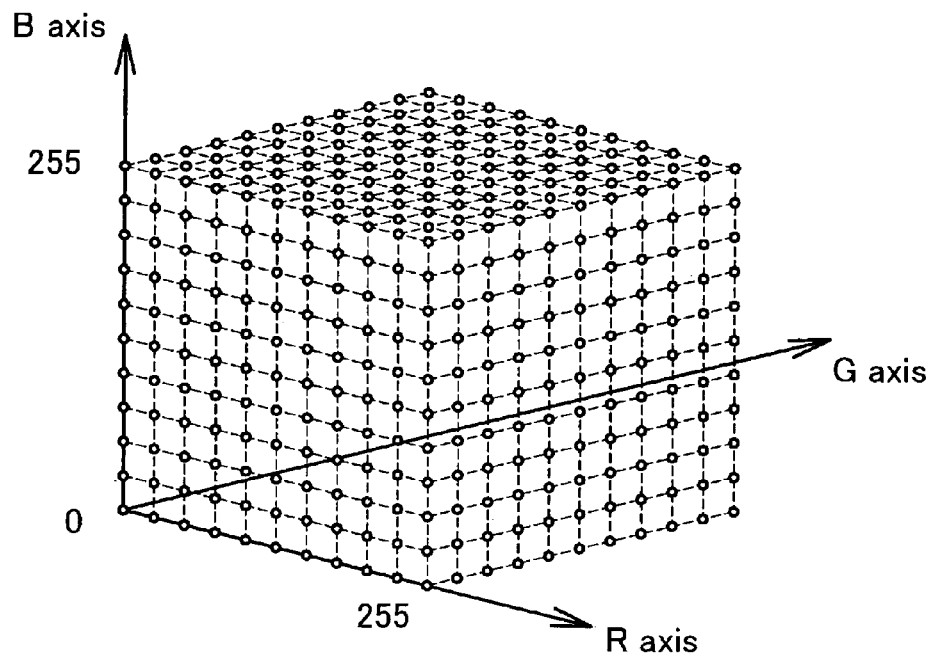
FIG. 6 is an explanatory drawing conceptually showing an LUT referenced for color conversion processing.
FIG. 7 is an explanatory drawing conceptually showing an example of part of a dither matrix.

The color conversion process is able to be performed rapidly by referencing a color conversion table (LUT). FIG. 6 is an explanatory drawing that conceptually shows the LUT referenced for color conversion processing. The LUT can be thought of as a three dimensional number chart if thought of in the following way. First, as shown in FIG. 6, we think of a color space using three orthogonal axes of the R axis, the G axis, and the B axis. When this is done, all the RGB image data can definitely be displayed correlated to coordinate points within the color space. From this, if the R axis, the G axis, and the B axis are respectively subdivided and a large number of grid points are set within the color space, each of the grid points can be thought of as representing the RGB image data, and it is possible to correlate the tone values of each color C, M, Y, and K corresponding to each RGB image data to each grid point. The LUT can be thought of as a three dimensional number chart in which is correlated and stored the tone values of each color C, M, Y, and K to the grid points provided within the color pace in this way. If color conversion processing is performed based on the correlation of RGB color image data and tone data of each color C, M, YU, and K stored in this kind of LUT, it is possible to rapidly convert RGB color image data to tone data of each color C, M, Y, and K.

When tone data of each color C, M, Y, and K is obtained in this way, the computer 100 starts the tone number conversion process (step S106). The tone number conversion process is the following kind of process. The image data obtained by the color conversion process, if the data length is 1 byte, is tone data for which values can be taken from tone value 0 to tone value 255 for each pixel. In comparison to this, the printer displays images by forming dots, so for each pixel, it is only possible to have either state of "dots are formed" or "dots are not formed." In light of this, instead of changing the tone value for each pixel, with this kind of printer, images are expressed by changing the density of dots formed within a specified area. The tone number conversion process is a process that, to generate dots at a suitable density according to the tone value of the tone data, decides the presence or absence of dot formation for each pixel.

As a method of generating dots at a suitable density according to the tone values, various methods are known such as the error diffusion method and the dither method, but with the Tone number conversion process of this embodiment, the method called the dither method is used. The dither method of this embodiment is a method that decides the presence or absence of dot formation for each pixel by comparing the threshold value set in the dither matrix and the tone value of the image data for each pixel. Following is a simple description of the principle of deciding on the presence or absence of dot formation using the dither method.

FIG. 7 is an explanatory drawing that conceptually shows an example of part of a dither matrix. The matrix shown in the drawing randomly stores threshold values selected thoroughly from a tone value range of 1 to 255 for a total of 8192 pixels, with 128 pixels in the horizontal direction (main scan direction) and 64 pixels in the vertical direction (Sub-scan direction). Here, selecting from a range of 1 to 255 for the tone value of the threshold value with this embodiment is because in addition to having the image data as 1 byte data that can take tone values from values 0 to 255, when the image data tone value and the threshold value are equal, it is decided that a dot is formed at that pixel.

Specifically, when dot formation is limited to pixels for which the image data tone value is greater than the threshold value (specifically, dots are not formed on pixels for which the tone value and threshold value are equal), dots are definitely not formed at pixels having threshold values of the same value as the largest tone value that the image data can have. To avoid this situation, the range that the threshold values can have is made to be a range that excludes the maximum tone value from the range that the image data can have. Conversely, when dots are also formed on pixels for which the image data tone value and the threshold value are equal, dots are always formed at pixels having a threshold value of the same value as the minimum tone value that the image data has. To avoid this situation, the range that the threshold values can have is made to be a range excluding the minimum tone value from the range that the image data can have. With this embodiment, the tone values that the image data can have is from 0 to 255, and since dots are formed at pixels for which the image data and the threshold value are equal, the range that the threshold values can have is set to 1 to 255. Note that the size of the dither matrix is not limited to the kind of size shown by example in FIG. 7, but can also be various sizes including a matrix for which the vertical and horizontal pixel count is the same.

FIG. 8 is an explanatory drawing that conceptually shows the state of deciding the presence or absence of dot formation for each pixel while referring to the dither matrix. When deciding on the presence or absence of dot formation, first, a pixel for deciding about is selected, and the tone value of the image data for that pixel and the threshold value stored at the position corresponding in the dither matrix are compared. The fine dotted line arrow shown in FIG. 8 typically represents the comparison for each pixel of the tone value of the image data and the threshold value stored in the dither matrix. For example, for the pixel in the upper left corner of the image data, the threshold value of the image data is 97, and the threshold value of the dither matrix is 1, so it is decided that dots are formed at this pixel. The arrow shown by the solid line in FIG. 8 typically represents the state of it being decided that dots are formed in this pixel, and of the decision results being written to memory. Meanwhile, for the pixel that is adjacent at the right of this pixel, the tone value of the image data is 97, and the threshold value of the dither matrix is 177, and since the threshold value is larger, it is decided that dots are not formed at this pixel, With the dither method, by deciding whether or not to form dots for each pixel while referencing the dither matrix in this way, image data is converted to data representing the presence or absence of dot formation for each pixel. In this way, if using the dither method, it is possible to decide the presence or absence of dot formation for each pixel with a simple process of comparing the tone value of the image data and the threshold value set in the dither matrix, so it is possible to rapidly implement the tone number conversion process.

Also, when the image data tone value is determined, as is clear from the fact that whether or not dots are formed on each pixel is determined by the threshold value set in the dither matrix, with the dither method, it is possible to actively control the dot generating status by the threshold value set in the dither matrix. With the tone number conversion process of this embodiment, using this kind of feature of the dither method, by deciding on the presence or absence of dot formation for each pixel using the dither matrix having the special characteristics described later, even in cases when there is dot formation position misalignment between dots formed during forward scan and dots formed during backward scan when doing bidirectional printing, it is possible to suppress to a minimum the degradation of image quality due to this. The principle of being able to suppress to a minimum the image quality degradation and the characteristics provided with a dither matrix capable of this are described in detail later.

When the tone number conversion process ends and data representing the presence or absence of dot formation for each pixel is obtained from the tone data of each color C, M, Y, and K, this time, the interlace process starts (step S108). The interlace process is a process that realigns the sequence of transfer of image data converted to the expression format according to the presence or absence of dot formation to the color printer 200 while considering the sequence by which dots are actually formed on the printing paper. The computer 100, after realigning the image data by performing the interlace process, outputs the finally obtained data as control data to the color printer 200 (step S110).

The color printer 200 prints images by forming dots on the printing paper according to the control data supplied from the computer 100 in this way. Specifically, as described previously using FIG. 3, the main scan and the Sub-scan of the carriage 240 are performed by driving the carriage motor 230 and the paper feed motor 235, and the head 241 is driven based on the dot data to match these movements, and ink drops are sprayed. As a result, suitable color ink dots are formed at suitable positions and an image is printed.

The color printer 200 described above forms dots while moving the carriage 240 back and forth to print images, so if dots are formed not only during the forward scan of the carriage 240 but also during the backward scan, it is possible to rapidly print images. It makes sense that when performing this kind of bidirectional printing, when dot formation position misalignment occurs between dots formed during the forward scan of the carriage 240 and the dots formed during the backward scan, the image quality will be degraded. In light of this, to avoid this kind of situation, a normal color printer is made to be able to adjust with good precision the timing of forming dots for at least one of during forward scan or backward scan. Because of this, it is possible to match the position at which dots are formed during the forward scan and the position at which dots are formed during the backward scan, and it is possible to rapidly print images with high image quality without degradation of the image quality even when bidirectional printing is performed. However, on the other hand, because it is possible to adjust with good precision the timing of forming dots, a dedicated adjustment mechanism or adjustment program is necessary, and there is a tendency for the color printer to become more complex and larger.

To avoid the occurrence of this kind of problem, with the computer 100 of this embodiment, even when there is a slight displacement of the dot formation position during the forward scan and the backward scan, the presence or absence of dot formation is decided using a dither matrix that makes it possible to suppress to a minimum the effect on image quality. If the presence or absence of dot formation for each pixel is decided by referencing this kind of dither matrix, even if there is slight displacement of the dot formation positions between the forward scan and the backward scan, there is no significant effect on the image quality. Because of this, it is not necessary to adjust with high precision the dot formation position, and it is possible to use simple items for the mechanism and control contents for adjustment, so it is possible to avoid the color printer from becoming needlessly large and complex. Following, the principle that makes this possible is described, and after that, a simple description is given of one method for generating this kind of dither matrix.

D. Principle of Suppressing Degradation of Image Quality Due to Dot Position Misalignment:

The invention of this application was completed with the discovery of new findings regarding images formed using the dither matrix as the beginning. In light of this, first, the findings we newly discovered as the beginning of the invention of this application are explained.

FIG. 9 is an explanatory drawing showing the findings that became the beginning of the invention of this application. Overall dot distribution Dpall shows an expanded view of the state of dots being formed at a specified density for forming images of certain tone values. As shown in Overall dot distribution Dpall, to obtain the optimal image quality image, it is necessary to form dots in a state dispersed as thoroughly as possible.

To form dots in a thoroughly dispersed state in this way, it is known that it is possible to reference a dither matrix having so-called blue noise characteristics to decide the presence or absence of dot formation. Here, a dither matrix having blue noise characteristics means a matrix like the following. Specifically, it means a dither matrix for which while dots are formed irregularly, the spatial frequency component of the set threshold value has the largest component in a high frequency range for which one cycle is two pixels or less. Note that bright (high brightness level) images and the like can also be cases when dots are formed in regular patterns near a specific brightness level.

Figure 10:
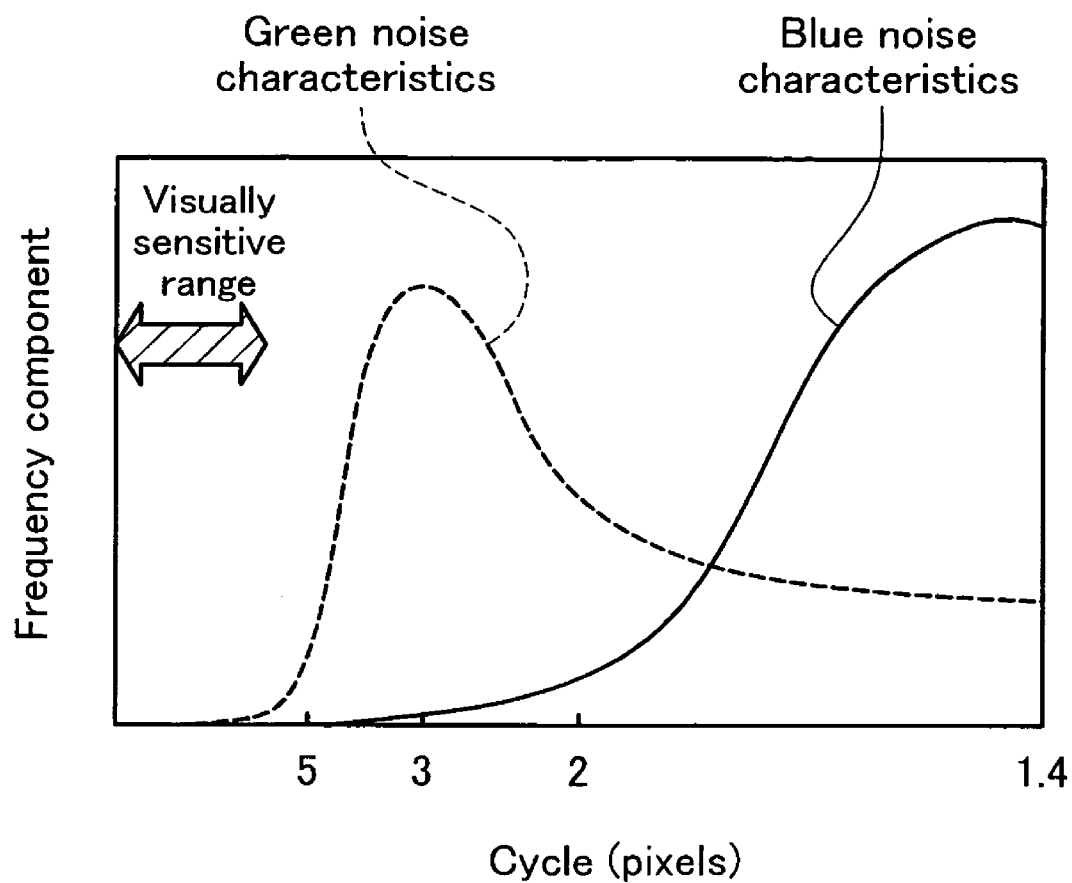
FIG. 10 is an explanatory drawing conceptually showing an example the spatial frequency characteristics of threshold values set for each pixel of the dither matrix having blue noise characteristics.

FIG. 10 is an explanatory drawing that conceptually shows an example of the spatial frequency characteristics of the threshold values set for each pixel of a dither matrix having blue noise characteristics (following, this may also be called a blue noise matrix). Note that with FIG. 10, in addition to the blue noise matrix spatial frequency characteristics, there is also a display regarding the spatial frequency characteristics of the threshold values set in a dither matrix having so called green noise characteristics (hereafter, this is also called a green noise matrix). The green noise matrix spatial frequency characteristics will be described later, but first, the blue noise matrix spatial frequency characteristics are described.

In FIG. 10, due to circumstances of display, instead of using spatial frequency for the horizontal axis, cycles are used. It goes without saying that the shorter the cycle, the higher the spatial frequency. Also, the vertical axis of FIG. 10 shows the spatial frequency component for each of the cycles. Note that the frequency components shown in the drawing indicate a state of being smoothed so that the changes are smooth to a certain degree.

The spatial frequency component of the threshold values set for the blue noise matrix is shown by example using the solid line in the drawing. As shown in the drawing, the blue noise matrix spatial frequency characteristics are characteristics having the maximum frequency component in the high frequency range for which one cycle length is two pixels or less. The threshold values of the blue noise matrix are set to have this kind of spatial frequency characteristics, so if the presence or absence of dot formation is decided based on a matrix having this kind of characteristics, then dots are formed in a state separated from each other.

From the kinds of reasons described above, if the presence or absence of dot formation for each pixel is decided while referencing a dither matrix having blue noise characteristics, as shown in the Overall dot distribution Dpall, it is possible to obtain an image with thoroughly dispersed dots. Conversely, because dots are generated dispersed thoroughly as shown in the Overall dot distribution Dpall, threshold values adjusted so as to have blue noise characteristics are set in the dither matrix.

Note that here, the spatial frequency characteristics of the threshold values set in the green noise matrix shown in FIG. 10 are described. The dotted line curve shown in FIG. 10 shows an example of green noise matrix spatial frequency characteristics. As shown in the drawing, green noise matrix spatial frequency characteristics are characteristics having the largest frequency component in the medium frequency range for which the length of one cycle is from two pixels to ten or more pixels. The green noise matrix threshold values are set so as to have this kind of spatial frequency characteristics, so when the presence or absence of dot formation for each pixel is decided while referencing a dither matrix having green noise characteristics, while dots are formed adjacent in several dot units, overall, the dot group is formed in a dispersed state. As with a so-called laser printer or the like, with a printer for which stable formation of fine dots of approximately one pixel is difficult, by deciding the presence or absence of dot formation while referencing this kind of green noise matrix, it is possible to suppress the occurrence of isolated dots. As a result, it becomes possible to rapidly output images with stable image quality. Conversely, threshold values adjusted to have green noise characteristics are set in the dither matrix referenced when deciding the presence or absence of dot formation with a laser printer or the like.

As described above, with an inkjet printer like the color printer 200, a dither matrix having blue noise characteristics is used, and therefore, as shown in the Overall dot distribution Dpall, the obtained image is an image with thoroughly dispersed dots. However, when this image is viewed with the dots formed during forward scan of the head separated from the dots formed during the backward scan, we found that the images made only by dots formed during the forward scan (forward scan images) and the images made only by dots formed during the backward scan (backward scan images) do not necessarily have the dots thoroughly dispersed. Dots formed during forward scan Dpf is an image obtained by extracting only the dots formed during the forward scan from the image shown in the Overall dot distribution Dpall. Also, Dots formed during backward scan Dpb is an image obtained by extracting only the dots formed during the backward scan from the image shown in the Overall dot distribution Dpall.

As shown in the drawing, if the dots formed by both the back and forth movements are matched, as shown in the Overall dot distribution Dpall, regardless of the fact that the dots are formed thoroughly, the image of only the dots formed during the forward scan shown in the dots formed during forward scan Dpf or the image of only the dots formed during the backward scan shown in the dots formed during backward scan Dpb are both generated in a state with the dots unbalanced.

In this way, though it is unexpected that there would be a big difference in tendency, if we think in the following way, it seems that this is a phenomenon that occurs half by necessity. Specifically, as described previously, the dot distribution status depends on the setting of the threshold values of the dither matrix, and the dither matrix threshold values are set with special generation of the distribution of the threshold values to have blue noise characteristics so that the dots are dispersed well. Here, among the dither matrix threshold values, threshold values of pixels for which dots are formed during the forward scan or threshold values of pixels for which dots are formed during the backward scan are taken, and with no consideration such has having the distribution of the respective threshold values having blue noise characteristics, the fact that the distribution of these threshold values, in contrast to the blue noise characteristics, have characteristics having a large frequency component in the long frequency range, seems half necessary (see FIG. 10). Also, for a dither matrix having green noise characteristics as well, when we consider that this is a matrix specially set for the threshold value distribution to have green noise characteristics, the threshold values of the pixels for which dots are formed during the forward scan or the backward scan are considered to have a large frequency component on a longer cycle side than the cycle for which the green noise matrix has a large frequency component (see FIG. 10). In the end, when the threshold values of pixels for which dots are formed during the forward scan or the threshold values of pixels for which dots are formed during the backward scan are taken from the dither matrix having blue noise characteristics, the distribution of those threshold values have large frequency components in the Visually sensitive range. Because of this, for example, even when images have dots thoroughly dispersed, when only dots formed during the forward scan or only dots formed during the backward scan are removed, the obtained images respectively are considered to be images for which the dots have unbalance occur such as shown in the dots formed during forward scan Dpf and the dots formed during backward scan Dpb. Specifically, the phenomenon shown in FIG. 9 is not a special phenomenon that occurs with a specific dither matrix, but rather can be thought of as the same phenomenon that occurs with most dither matrixes.

Considering the kind of new findings noted above and the considerations for these findings, studies were done for other dither matrixes as well. With the study, to quantitatively evaluate the results, an index called the granularity index was used. In light of this, before describing the study results, we will give a brief description of the granularity index.

Figures 11A, 11B, 11C:
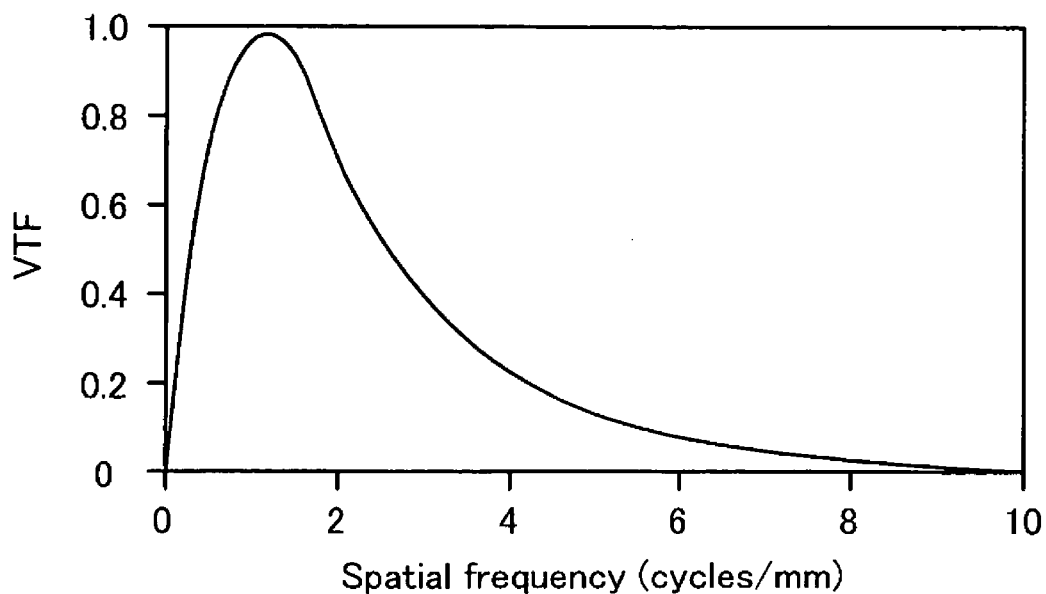
FIGS. 11(A), 11(B), and 11(C) are explanatory drawings conceptually showing the sensitivity characteristics VTF for the spatial frequency of the visual sense that humans have.

FIG. 11 is an explanatory drawing that conceptually shows the sensitivity characteristics VTF (Visual Transfer Function) to the visual spatial frequency that humans have. As shown in the drawing, human vision has a spatial frequency showing a high sensitivity, and there is a characteristic of the sensitivity decreasing gradually as the spatial frequency increases. It is also known that there is a characteristic of the vision sensitivity decreasing also in ranges for which the spatial frequency is extremely low. An example of this kind of human vision sensitivity characteristic is shown in FIG. 11 ($a$). Various experimental formulae have been proposed as an experimental formula for giving this kind of sensitivity characteristic, but a representative experimental formula is shown in FIG. 11 ($b$). Note that the variable L in FIG. 11 ($b$) represents the observation distance, and the variable u represents the spatial frequency.

Based on this kind of visual sensitivity characteristic VTF, it is possible to think of a granularity index (specifically, an index representing how easy it is for a dot to stand out). Now, we will assume that a certain image has been Fourier transformed to obtain a power spectrum. If that power spectrum happens to contain a large frequency component, that doesn't necessarily mean that that image will immediately be an image for which the dots stand out. This is because as described previously using FIG. 11 ($a$), if that frequency is in the low range of human visual sensitivity, for example even if it has a large frequency component, the dots do not stand out that much. Conversely, with frequencies in the high range of human visual sensitivity, for example even when there are only relatively low frequency components, for the entity doing the viewing, there are cases when the dots are sensed to stand out. From this fact, the image is Fourier transformed to obtain a power spectrum FS, the obtained power spectrum FS is weighted to correlate to the human visual sensitivity characteristic VTF, and if integration is done with each spatial frequency, then an index indicating whether or not a human senses the dots as standing out or not is obtained. The granularity index is an index obtained in this way, and can be calculated by the calculation formula shown in FIG. 11 ($c$). Note that the coefficient K in FIG. 11 ($c$) is a coefficient for matching the obtained value with the human visual sense.

To confirm that the phenomenon described previously using FIG. 9 is not a special phenomenon that occurs with a specific dither matrix, but rather occurs also with most dither matrixes, the following kind of study was performed on various dither matrixes having blue noise characteristics. First, from among the dots formed by bidirectional printing, images made only by dots formed during the forward scan such as shown in the dots formed during forward scan Dpf (forward scan images) are obtained. Next, the granularity index of the obtained images is calculated. This kind of operation was performed for various dither matrixes while changing the image tone values.

Figure 12A:
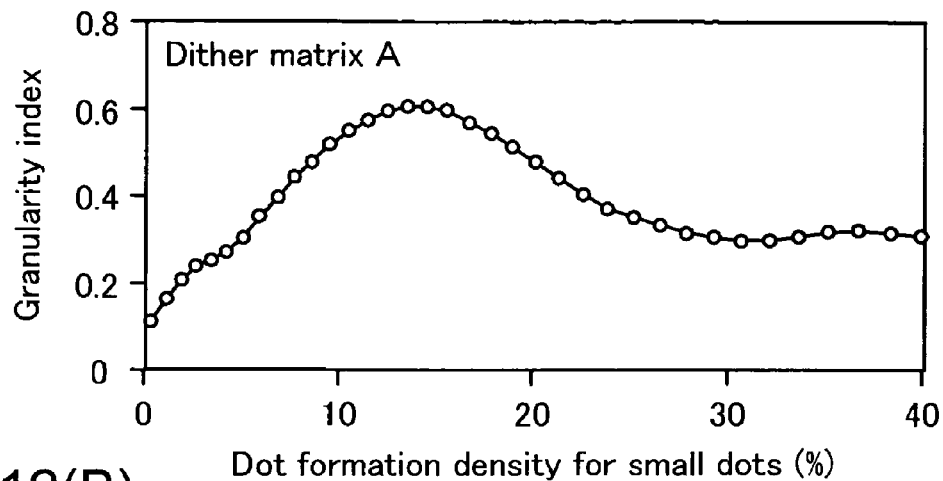
FIGS. 12(A), 12(B), and 12(C) are explanatory drawings showing the results of studying the granularity index of forward scan images for various dither matrixes having blue noise characteristics.
Figure 12B:
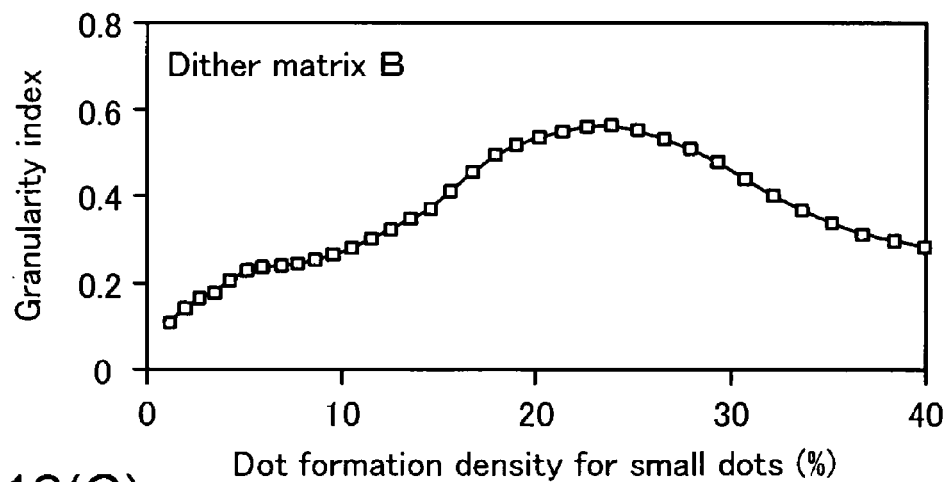
Figure 12C:
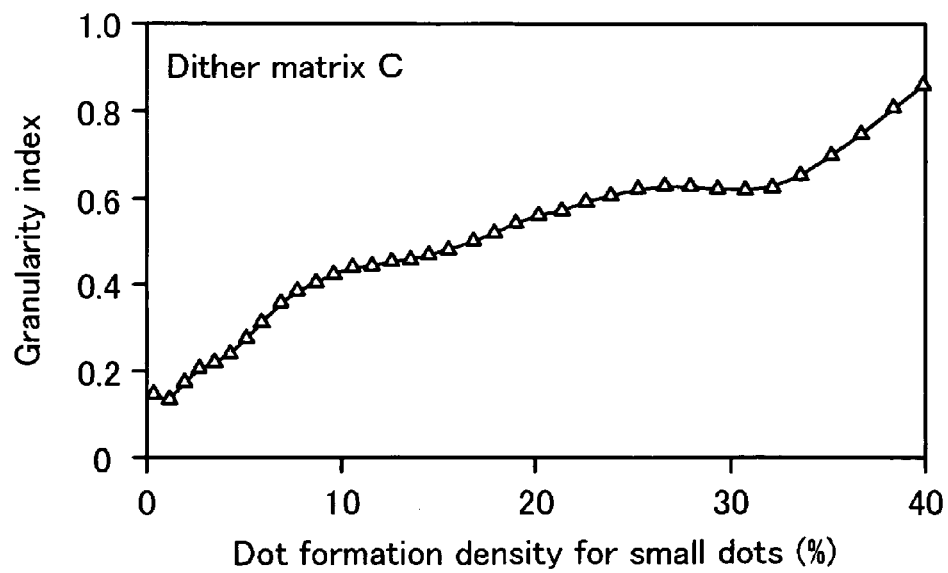

FIG. 12 is an explanatory drawing showing the results of studying the granularity index of forward scan images for various dither matrixes having blue noise characteristics. Shown in FIG. 12 are only the results obtained for three dither matrixes with different resolutions. The dither matrix A shown in FIG. 12 (a) is a dither matrix for printing at a main scan direction resolution of 1440 dpi and Sub-scan direction resolution of 720 dpi, and the dither matrix B shown in FIG. 21 (b) is a dither matrix used for printing at a resolution of 1440 dpi for both the main scan direction and the Sub-scan direction. Also, the dither matrix C shown in FIG. 12 (c) is a dither matrix for printing in the main scan direction at a resolution of 720 dpi and in the Sub-scan direction at a resolution of 1440 dpi. Note that in FIG. 12, the horizontal axis is displayed using the small dot formation density, and the areas for which the displayed small dot formation density is 40% or less correlate to areas up to before the intermediate gradation area from the highlight area for which it is considered that the dots stand out relatively easily.

Regardless of the fact that the three forward scan images shown in FIG. 12 are generated from individually created dither matrixes for printing respectively at different resolutions, each has an area for which the granularity index is degraded (specifically, an area in which the dots stand out easily). In this kind of area, the forward scan image can be thought of as the dots generating imbalance as shown in the dots formed during forward scan Dpf. In the end, all of the three dither matrixes shown in FIG. 12 have blue noise characteristics, and therefore, regardless of the fact that the images formed using bidirectional printing have dots formed without imbalance, in at least part of the gradation area, the forward scan image or the backward scan image has dot imbalance occur. From this, the phenomenon described previously using FIG. 9 can be thought of not as a special phenomenon that occurs with a specific dither matrix but rather as a general phenomenon that occurs with most dither matrixes. Then, when we consider the occurrence of dot imbalance with either forward scan images or backward scan images in this way, this can be thought of as possibly having an effect on the image quality degradation due to dot position misalignment during bidirectional printing. In light of this, we tried studying to see whether or not any kind of correlation can be seen between the granularity index of images formed with an intentional displacement in the dot formation position during bidirectional printing (position misalignment image) and the granularity index of forward scan images.

Figure 13A:
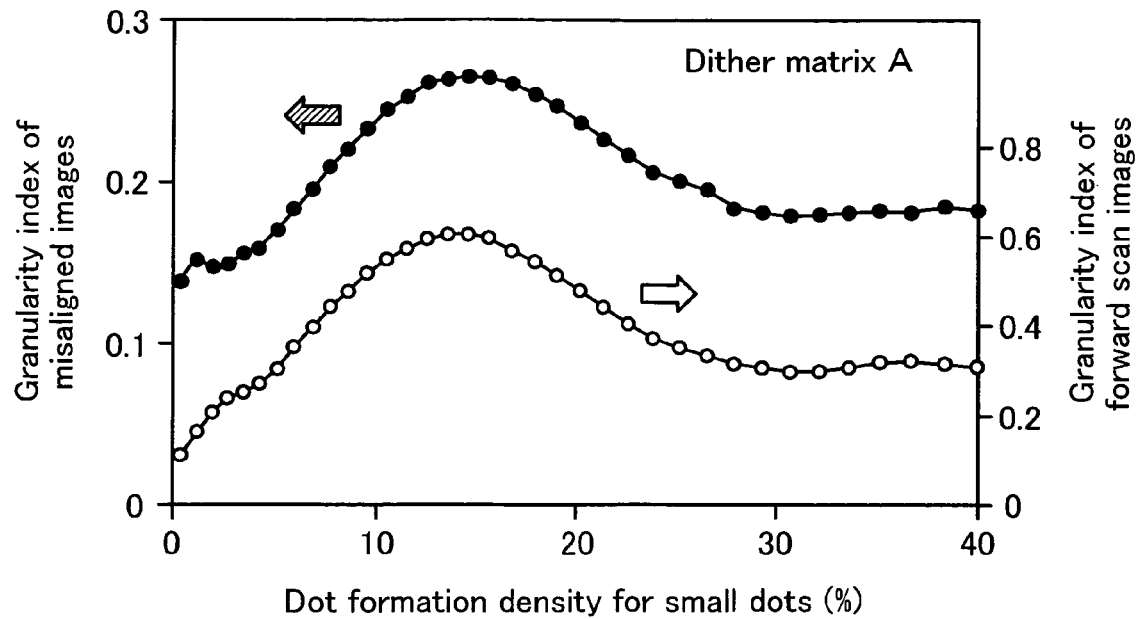
FIGS. 13(A) and 13(B) are explanatory drawings showing the results of studying the correlation coefficient between the position misalignment image granularity index and the forward scan image granularity index.
Figure 13B:
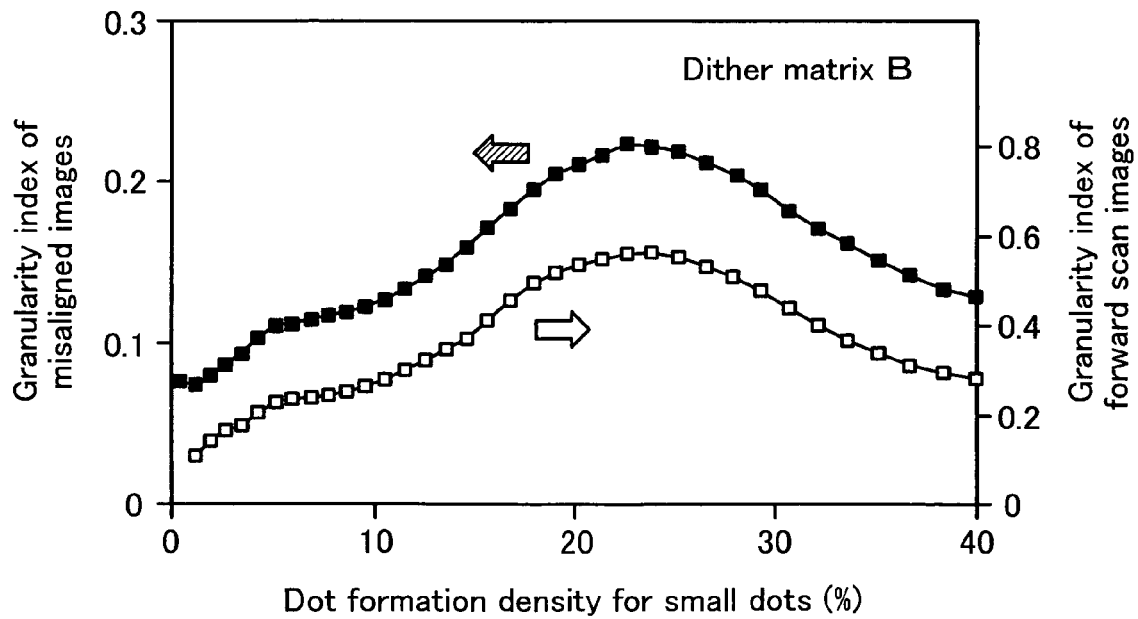

FIG. 13 is an explanatory drawing showing the results of studying the correlation coefficient between the position misalignment image granularity index and the forward scan image granularity index. FIG. 13 (a) shows the results of a study on the dither matrix A shown in FIG. 12 (a), and in the drawing, the black circles represent the position misalignment image granularity index and the white circles in the drawing represent the granularity index for the forward scan image. Also, FIG. 13 (b) shows the results of a study on the dither matrix B shown in FIG. 12 (b), and the black squares represent the position misalignment image granularity index while the white squares represent the forward image granularity index. As is clear from FIG. 13, for any of the dither matrixes, a surprisingly strong correlation is seen between the position misalignment image granularity index and the forward image granularity index. From this fact, for the phenomenon of the image quality being degraded by the dot position misalignment during bidirectional printing, the fact that the bidirectional image dot imbalance becomes marked due to displacement of the relative position between the forward scan images and the backward scan images can be considered to be one significant factor. Conversely, if the dot imbalance between the forward scan images and the backward scan images is reduced, for example even when dot position misalignment occurs during bidirectional printing, it is thought that it is possible to suppress image quality degradation.

Figure 14:
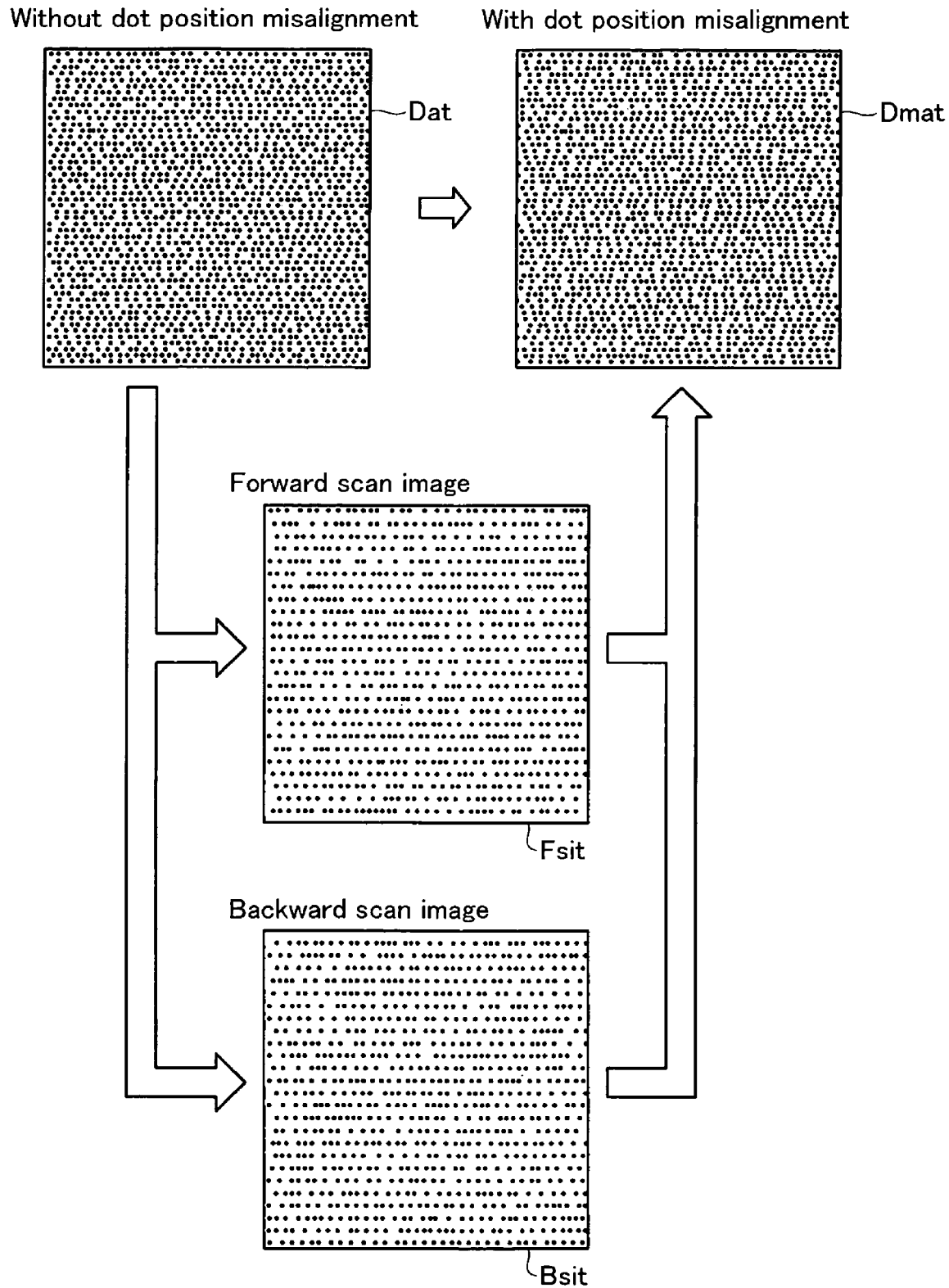
FIG. 14 is an explanatory drawing showing the principle of it being possible to suppress the image quality degradation even when dot position misalignment occurs during bidirectional printing.

FIG. 14 is an explanatory drawing showing that it is possible to suppress the image quality degradation when dot position misalignment occurs during bidirectional printing if the dot imbalance is reduced for images during forward scan and images during backward scan. Dot pattern Dat and dot pattern Dmat show a comparison of an image for which bidirectional printing was performed in a state without dot position misalignment and an image printed in a state with intentional displacement by a specified volume of the dot formation position. Also, shown respectively in FIG. 14, Forward scan image Fsit and Backward scan image Bsit are images obtained by breaking down into an image made only by dots formed during the forward scan of the head (forward scan image) and an image made only by dots formed during the backward scan (backward scan image).

As shown in the forward scan image Fsit and the backward scan image Bsit, the forward scan images and the backward scan images are both images for which the dots are dispersed thoroughly. Also, as shown in the forward scan image Fsit, in the state with no dot position misalignment, images obtained by synthesizing the forward scan images and backward scan images (specifically, images obtained with bidirectional printing) are also images for which the dots are dispersed thoroughly. In this way, not just images obtained by performing bidirectional printing, but also when broken down into forward scan images and backward images, images that have the dots dispersed thoroughly with the respective images can be obtained by deciding the presence or absence of dot formation while referencing a dither matrix having the kind of characteristics described later in the tone number conversion process of FIG. 5. Then, the backward scan image Bsit correlates to an image for which this kind of forward scan image and backward scan image are overlapped in a state displaced by a specified amount.

If the image without position misalignment (left side image) shown in the forward scan image Fsit and the image with position misalignment (right side image) are compared, by the dot position being displaced, the right side image has its dots stand out slightly more easily than the left side image with no displacement, but we can understand that this is not at a level that greatly degrades the image quality. This is thought to show that even when broken down into forward scan images and backward scan images, if dots are generated so that the dots are dispersed thoroughly, for example even when dot position misalignment occurs during bidirectional printing, it is possible to greatly suppress degradation of image quality due to this.

As a reference, with the image formed using a typical dither matrix, we checked to what degree image quality degraded when dot position misalignment occurred by the same amount as the case shown in FIG. 14. FIG. 15 is an explanatory drawing showing degradation of the image quality due to the presence or absence of dot position misalignment with the image formed by a typical dither matrix. The image without position misalignment (left side image) shown in Dot pattern Dar is an image for which the forward scan image and backward scan image shown in FIG. 9 are overlapped without any position misalignment. Also, the image with position misalignment shown in Dot pattern Dar is an image for which the forward scan image and the backward scan image are overlapped in a state with the position displaced by the same amount as the case shown in FIG. 14. Note that in the forward scan image Fsir and the backward scan image Bsir, the respective forward scan images and backward scan images are shown.

As is clear from FIG. 15, when dots are generated with imbalance with the forward scan image and the backward scan image, it is possible to confirm that when the dot formation positions are displaced during bidirectional printing, there is great degradation of the image quality when the image quality is greatly degraded [sic]. Also, when FIG. 14 and FIG. 15 are compared, by thoroughly dispersing the dots with the forward scan image and the backward scan image, it is possible to understand that the image quality degradation due to dot position misalignment can be dramatically improved.

With the color printer 200 of this embodiment, based on this kind of principle, it is possible to suppress to a minimum the image quality degradation due to dot position misalignment during bidirectional printing. Because of this, during bidirectional printing, even when the formation positions of the dots formed during forward scan and the dots formed during backward scan are not matched with high precision, there is no degradation of image quality. As a result, there is no need for a mechanism or control program for adjusting with good precision the dot position misalignment, so it is possible to use a simple constitution for the printer. Furthermore, it is possible to reduce the precision required for the mechanism for moving the head back and forth as well, and this point also makes it possible to simplify the printer constitution.

E. Dither Matrix Generating Method:

Next, a simple description is given of an example of a method of generating a dither matrix to be referenced by the tone number conversion process of this embodiment. Specifically, with the tone number conversion process of this embodiment, for dots formed during the forward scan, for dots formed during the backward scan, and furthermore, for combinations of these dots, dots are generated in a thoroughly dispersed state, so gradation conversion processing is performed while referencing a dither matrix having the following two kinds of characteristics.

"First Characteristic": The dither matrix pixel positions can be classified into first pixel position groups and second pixel position groups. Here, the first pixel position and the second pixel position mean pixel positions having a mutual relationship such that when dots are formed by either the forward scan or the backward scan, the other has dots formed by the other.

"Second Characteristic": The dither matrix and a matrix for which the threshold values set for the first pixel position are removed from that dither matrix (first pixel position matrix), and a matrix for which the threshold values set for the second pixel positions are removed (second pixel position matrix) all have either blue noise characteristics or green noise characteristics. Here, a "dither matrix having blue noise characteristics" means the following kind of matrix. Specifically, it means a dither matrix for which dots are generated irregularly and the spatial frequency component of the set threshold values have the largest component in the medium frequency range for which one cycle is from two pixels to ten or more pixels. Also, a "dither matrix having green noise characteristics" means a dither matrix for which dots are formed irregularly and the spatial frequency component of the set threshold values have the largest component in the medium frequency range for which one cycle has from two pixels to ten or more pixels. Note that if these dither matrixes are near a specific brightness, it is also acceptable if there are dots formed in a regular pattern.

As described previously, dither matrixes having these kind of characteristics can definitely not be generated by coincidence, so a brief description is given of an example of a method for generating this kind of dither matrix.

FIG. 16 is a flow chart showing the flow of the process of generating dither matrixes referenced with the tone number conversion process of this embodiment. Note that here, with an existing dither matrix having blue noise characteristics as a source, so that the "first characteristics" and "second characteristics" described above can be obtained, described is a method to which correction is added. It makes sense that rather than correcting the matrix that is the source, that it is also possible to generate first from a dither matrix having the "first characteristics" and "second characteristics." Also, here, described is a case when a matrix having blue noise characteristics is the source, but it is also possible to obtain a dither matrix having the characteristics noted above by working in about the same manner when using a dither matrix having green noise characteristics as the source as well.

When the dither matrix generating process starts, first, the dither matrix that is the source is read (step S200). This matrix overall has blue noise characteristics, but the first pixel position matrix (the matrix for which the threshold values set at the first pixel position are removed from the dither matrix) and the second pixel position matrix (the matrix for which the threshold values set at the second pixel position are removed from the dither matrix) are both matrixes that do not have blue noise characteristics. Note that as described previously, the first pixel position and the second pixel position mean pixel positions in a mutual relationship for which when dots are formed either during forward scan or backward scan, the other has dots formed by the other.

Next, the read matrix is set as matrix A (step S202). Then, from the dither matrix A, two pixel positions (pixel position P and pixel position Q) are randomly selected (step S204), the threshold value set at the selected pixel position P and the threshold value set at the selected pixel position Q are transposed, and the obtained matrix is used as matrix B (step S206).

Next, the granularity evaluation value Eva for the matrix A is calculated (step S208). Here, the granularity evaluation value means an evaluation value obtained as follows. First, using the dither method on 256 images of tone values 0 to 255, 256 images are obtained expressed by the presence or absence of dot formation. Next, each image is broken down into forward scan images and backward scan images. As a result, for each of the tone values from 0 to 255, obtained are the forward scan image, the backward scan image and an image for which these are overlapped (total image). For the 768 (=256×3) images obtained in this way, after calculation of the granularity index described previously using FIG. 11, the value obtained by finding the average value of these is used as the granularity evaluation value. Note that when calculating the granularity evaluation value, rather than simply using an arithmetic mean of the 768 granularity indices, it is also possible to take a weighted average respectively of the forward scan image, the backward scan image, and the total image. Alternatively, for a specific tone value (e.g. a low tone range for which it is said that dots stand out relatively easily), it is also possible to apply a large weighting coefficient and take the average. At step S208 of FIG. 16, for the matrix A, this kind of granularity evaluation value is found, and the obtained value is used as the granularity evaluation value Eva.

When the granularity evaluation value Eva is obtained for the matrix A, the granularity evaluation value Evb is calculated in the same manner for the matrix B as well (step S210). Next, the granularity evaluation value Eva for the matrix A and the granularity evaluation value Evb for the matrix B are compared (step S212). Then, when it is determined that the granularity evaluation value Eva is bigger (step S212: yes), the matrix B for which the threshold values set in the two pixel positions are transposed is through to have more desirable characteristics than the matrix A which is the source. In light of this, in this case, the matrix B is reread as matrix A (step S214). Meanwhile, when it is decided that the granularity evaluation value Evb of the matrix B is larger than the granularity evaluation value Eva of the matrix A (step S212: no), then matrix is not reread.

In this way, only in the case when it is determined that the granularity evaluation value Eva of the matrix A is larger than the granularity evaluation value Evb of the matrix B, when the operation of rereading the matrix B as the matrix A, a determination is made of whether or not the granularity evaluation values are converged (step S216). Specifically, the dither matrix set as the source has the dots formed during the forward scan and the dots formed during the backward scan generated with imbalance, so immediately after starting the kind of operation noted above, a large value is taken for the granularity evaluation value. However, by transposing the threshold values set in the two pixel position locations, when a smaller granularity evaluation value is obtained, if the matrix for which the threshold value is transposed is used, and the operation described above is further repeated for this matrix, the obtained granularity evaluation value becomes smaller, and it is thought that over time it becomes stable at a certain value. At step S216, a determination is made of whether or not the granularity evaluation value has stabilized, or said another way, whether or not it can be thought of as having reached bottom. For whether or not the granularity evaluation values have converged, for example, when the granularity evaluation value Evb of the matrix B is smaller than the granularity evaluation value Eva of the matrix A, the decrease volume of the granularity evaluation value is obtained, and if this decrease volume is a fixed value or less that is stable across a plurality of operations, it can be determined that the granularity evaluation values have converged.

Then, when it is determined that the granularity evaluation values have not converged (step S216: no), the process backwards to step S204, and after selecting two new pixel positions, the subsequent series of operations is repeated. While repeating this kind of operation, over time, the granularity evaluation values converge, and when it is determined that the granularity evaluation values have converged (step S216: yes), the matrix A at that time becomes a dither matrix having the previously described "first characteristics" and "second characteristics." In light of this, this matrix A is stored (step S218), and the dither matrix generating process shown in FIG. 16 ends.

If tone number conversion processing is performed while referencing a dither matrix obtained in this way, and a decision is made on the presence or absence of dot formation for each pixel, it goes without saying for the overall image, as well as for the forward scan images and the backward scan images, that it is possible to obtain images for which the dots are dispersed well. Because of this, for example even when there is slight displacement of the dot formation positions during bidirectional printing, it is possible to suppress to a minimum the effect on the image quality by this.

Note that with this embodiment, the granularity evaluation value Eva used to evaluate the dither matrix is calculated based on the granularity index that is the subjective evaluation value that uses the visual sensitivity characteristic VTF, but it is also possible to calculate based on the RMS granularity that is the standard deviation of the density distribution, for example.

The granularity index is a well known method and is an evaluation index used widely from the past. However, calculation of the granularity index, as described previously, means obtaining the power spectrum FS by doing Fourier transformation of an image, and it is necessary to add a weighting to the obtained power spectrum FS that correlates to the human visual sensitivity characteristics VTF, so there is the problem of the calculation volume becoming very large. Meanwhile, the RMS granularity is an objective measure representing variance of dot denseness, and this can be calculated simply just by the smoothing process using a smoothing filter set according to the resolution and calculation of the standard deviation of the dot formation density, so it is perfect for optimization processing which has many repeated calculations. In addition, use of the RMS granularity has the advantage of flexible processing being possible considering the human visual sensitivity and visual environment according to the design of the smoothing filter in comparison to the fixed process that uses the human visual sensitivity characteristics VTF.

Also, with the embodiment described above, the first pixel position and the second pixel position were described as pixel positions having a mutual relationship whereby when dots are formed by either of the forward scan or the backward scan, with the other, dots are formed by the other. Specifically, even within a row of pixels aligned in the main scan direction (this kind of pixel alignment is called a "raster"), there are cases when a first pixel position and a second pixel position are included. However, from the perspective of securing image quality during occurrence of dot position misalignment, it is preferable that the first pixel positions and the second pixel positions not be mixed within the same raster. Following is a description of the reason for this.

Figure 17A:
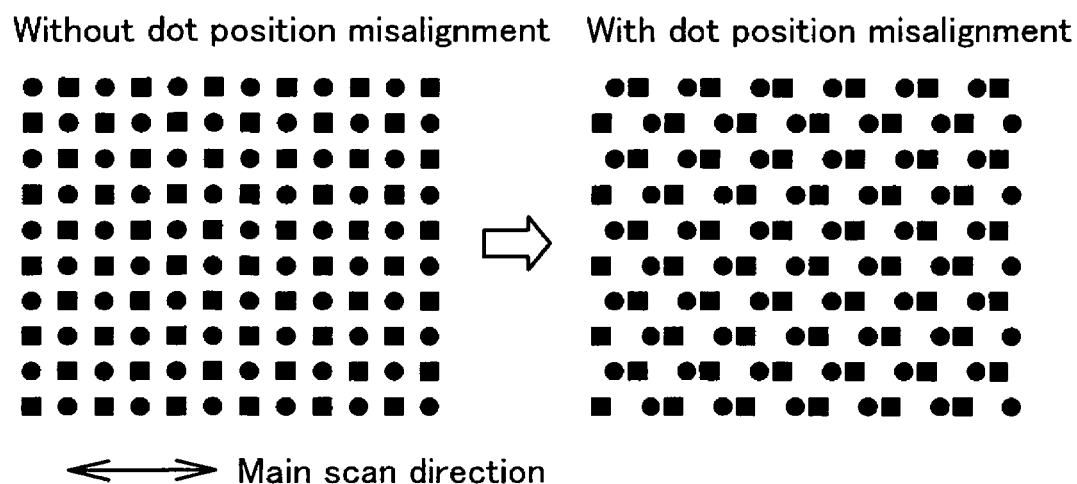
FIGS. 17(A) and 17(B) are explanatory drawings showing the reason that it is possible to ensure image quality during the occurrence of dot position misalignment by not allowing mixing of first pixel positions and second pixel positions within the same raster.
Figure 17B:
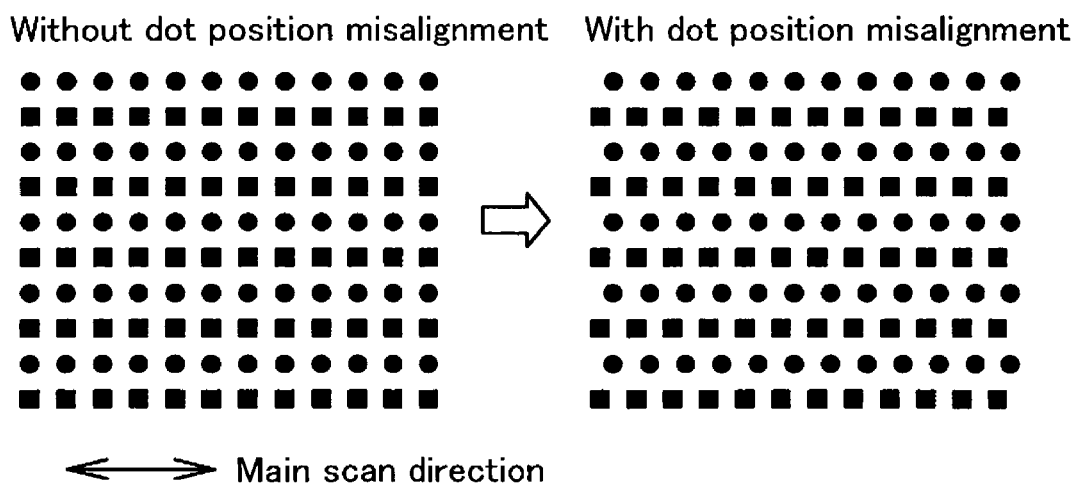

FIG. 17 is an explanatory drawing showing the reason that it is possible to ensure image quality when dot position misalignment occurs by not mixing the first pixel positions and the second pixel positions within the same raster. The black circles shown in the drawing indicate dots formed during the forward scan, and the black squares indicate dots formed during the backward scan. Specifically, if one of the black circles or black squares is set as the first pixel position, then the other is set as the second pixel position.

FIG. 17 (a) represents a state in which the first pixel position and the second pixel position are mixed in the same raster, and FIG. 17 (b) represents a state in which the first pixel position and the second pixel position are not mixed in the same raster. Also, in the respective drawings, the drawing shown at the left side indicates an image in a state without dot position misalignment, and the drawing at the right side indicates an image in a state with dot position misalignment. As is clear from FIG. 17 (a), when the first pixel position and the second pixel positions are mixed in the same raster, when dot position misalignment occurs, by the distance between dots within the raster occurring at close locations and at distant locations, this degrades the image quality. In comparison to this, as shown in FIG. 17 (b), if the first pixel position and the second pixel position are not mixed in the same raster, for example, even when dot position misalignment occurs, there is no occurrence of the dot distance in a raster being at close locations and distant locations, and it is possible to suppress degradation of the image quality.

In addition, as shown in FIG. 17 (b), if the first pixel position rasters and the second pixel position rasters are arranged alternately, for example, even when dot position misalignment occurs, the dots are displaced in one direction across the subsequent rasters, and it is possible to avoid having this visually recognized, degrading the image quality.

As described above, the first pixel position dither matrix and the second pixel position dither matrix are dither matrixes having blue noise characteristics (or green noise characteristics), and in addition, if the first pixel positions and the second pixel positions are made not to be mixed within the same raster, for example even if the dot formation positions are displaced during bidirectional printing, it is possible to more effectively suppress this from causing degradation of the image quality.

F. Variation Examples:

Above, a number of embodiments of the invention were described, but the invention is in no way limited to these kinds of embodiments, and it is possible to embody various aspects in a scope that does not stray from the key points. For example, the following kinds of variation examples are possible.

Figure 18:
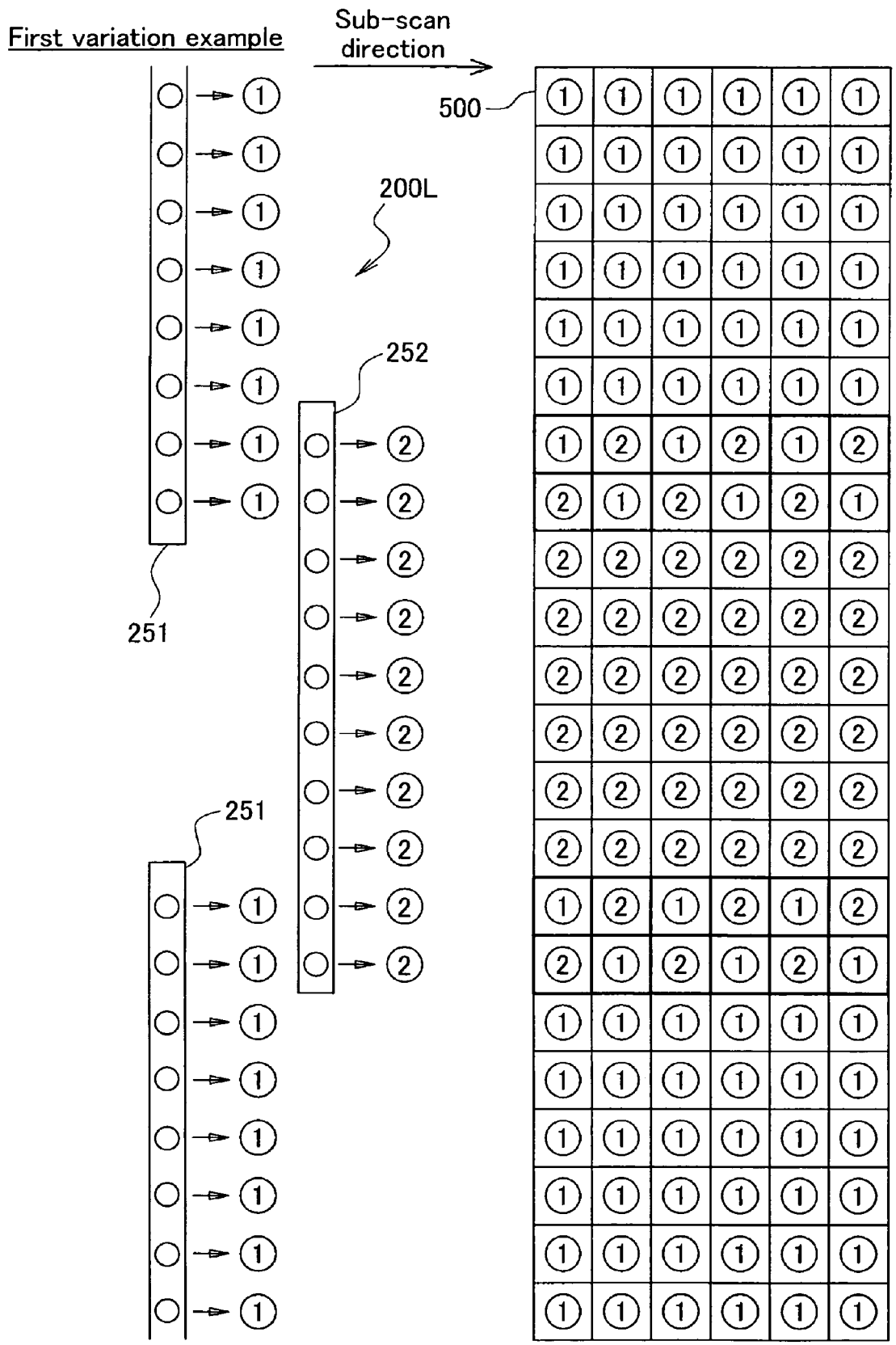
FIG. 18 is an explanatory drawing showing the printing status by line printer 200L having printing heads 251 and 252 for the first variation example of the invention.

F-1. First Variation Example:

FIG. 18 is an explanatory drawing showing the printing state using a line printer 200L having a plurality of printing heads 251 and 252 for the first variation example of the invention. The printing head 251 and the printing head 252 are respectively arranged in a plurality at the upstream side and the downstream side. The line printer 200L is a printer that outputs at high speed by performing only Sub-scan feed without performing the main scan.

Shown at the right side of FIG. 18 is a dot pattern 500 formed by the line printer 200L. The numbers 1 and 2 inside the circles indicate that it is the printing head 251 or 252 that is in charge of dot formation. In specific terms, dots for which the numbers inside the circle are 1 and 2 are respectively formed by the printing head 251 and the printing head 252.

Inside the bold line of the dot pattern 500 is an overlap area at which dots are formed by both the printing head 251 and the printing head 252. The overlap area makes the connection smooth between the printing head 251 and the printing head 252, and is provided to make the difference in the dot formation position that occurs at both ends of the printing heads 251 and 252 not stand out. This is because at both ends of the printing heads 251 and 252, the individual manufacturing difference between the printing heads 251 and 252 is big, and the dot formation position difference also becomes bigger, so there is a demand to make this not stand out clearly.

In this kind of case as well, the same phenomenon as when the dot formation position is displaced between the forward scan and the backward scan as described above occurs due to the error in the mutual positional relationship of the printing heads 251 and 252, so it is possible to try to improve image quality by performing the same process as the embodiment described previously using the pixel position group formed by the printing head 251 and the pixel position group formed by the printing head 252.

Figure 19:
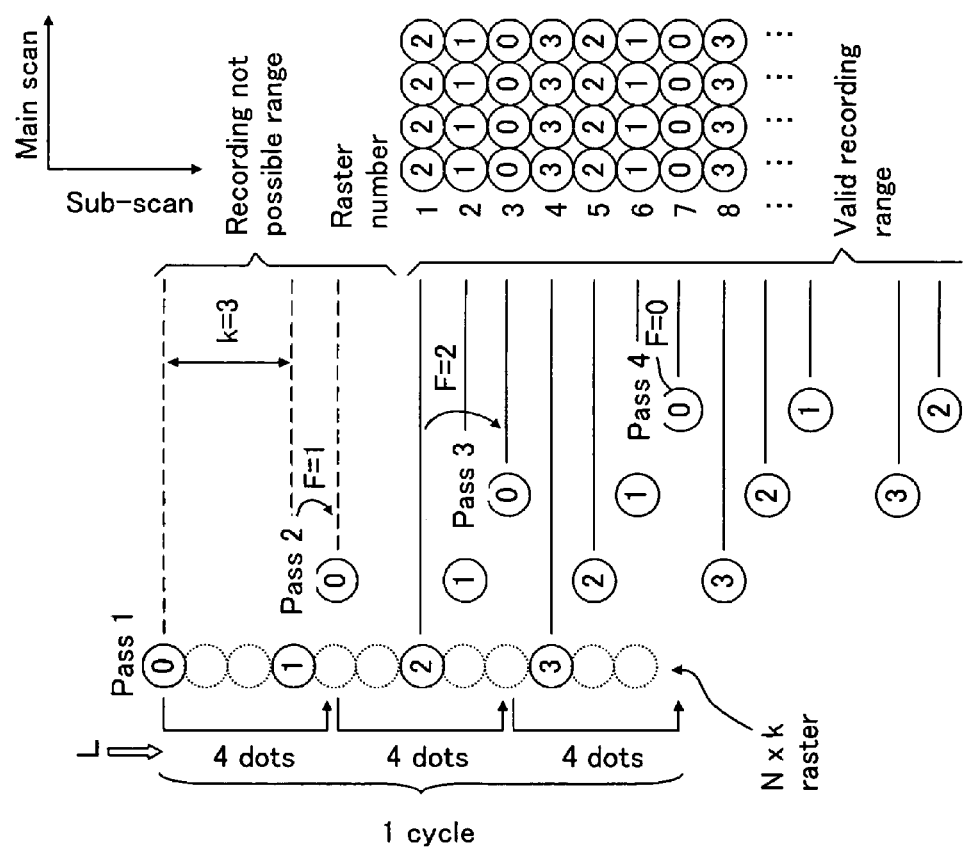
FIGS. 19(A) and 19(B) are explanatory drawings showing the printing status using the interlace recording method for the second variation example of the invention.

F-2. Second Variation Example:

FIG. 19 is an explanatory drawing showing the state of printing using the interlace recording method for the second variation example of the invention. The interlace recording method means a recording method used when the nozzle pitch k "dots" are 2 or greater measured along the Sub-scan direction of the printing head. With the interlace recording method, a raster line that cannot be recorded between adjacent nozzles with one main scan is left, and the pixels on this raster line are recorded during another main scan. With this variation example, the main scan is also called a pass.

FIG. 19 (A) shows an example of the Sub-scan feed when using four nozzles, and FIG. 19 (B) shows the parameters of that dot recording method. In FIG. 19 (A), the solid line circles containing numbers indicate the Sub-scan direction position of the four nozzles for each pass. Here, "pass" means one main scan. The numbers 0 to 3 in the circles mean the nozzle numbers. The position of the four nozzles is sent in the Sub-scan direction each time one main scan ends.

As shown at the left end of FIG. 19 (A), with this example, the Sub-scan feed volume L is a fixed value of four dots. Therefore, each time a Sub-scan feed is performed, the four nozzle positions are displaced in the Sub-scan direction four dots at a time. Each nozzle has as a recording subject all the dot positions (also called "pixel positions") on the respective raster lines in one main scan. At the right end of FIG. 19 (A) is shown the number of the nozzle that records the dots on each raster line.

In FIG. 19 (B) are shown the various parameters relating to this dot recording method. Included in the parameters of the dot recording method are nozzle pitch k [dots], used nozzle count N [units], and Sub-scan feed volume L [dots]. With the example in FIG. 19, the nozzle pitch k is three dots. The used nozzle count N is four units.

Shown in the table in FIG. 19 (B) are the Sub-scan feed volume L for each pass, the cumulative value $\Sigma L$ thereof, and the nozzle offset F. Here, the offset F is a value that, when a reference position is assumed for which the offset is 0 for a cyclical position of the nozzles for the first pass 1 (in FIG. 19, the position at every four dots), indicates by how many dots the nozzle position for each pass after that is separated in the Sub-scan direction from the reference position. For example, as shown in FIG. 19 (A), after pass 1, the nozzle position moves in the Sub-scan direction by an amount Sub-scan feed volume L (four dots). Meanwhile, the nozzle pitch k is three dots. Therefore, the offset F of the nozzles for pass 2 is 1 (see FIG. 19 (A)). Similarly, the nozzle position for pass 3 is $\Sigma L=8$ dots moved from the initial positions, and the offset F is 2. The nozzle position for pass 4 is $\Sigma L=12$ dots moved from the initial position, and the offset F is 0. With pass 4 after three Sub-scan feeds, the nozzle offset F backwards to 0, so with three Sub-scans as one cycle, by repeating this cycle, it is possible to record all the dots on the raster line in an effective recording range.

In this way, with the second variation example, in contrast to embedding the dots with the forward scan and backward scan as described above, dots are embedded with one cycle three passes, so it is conceivable that there will be displacement of mutual positions between each pass in one cycle due to Sub-scan feed error. Because of this, it is possible that the same phenomenon will occur as when the dot formation positions are displaced with the forward scan and backward scan described above, so it is possible to try to improve the image quality using the same process as the embodiments described above with a pixel position group formed with the first pass of each cycle, a pixel position group formed with the second pass, and a pixel position group formed with the third pass.

Note that with the interlace recording method, each cycle does not necessarily embed dots with three passes, and it is also possible to constitute one cycle with two times or four times or more. In this case, it is possible to do group division for each pass that constitutes each cycle.

Also, the group division does not necessarily have to be performed on all the passes that constitute each cycle, and for example, it is also possible to constitute this to be divided into a pixel position group formed with the last pass of each cycle for which Sub-scan feed error accumulation is anticipated and a pixel position group formed with the first pass of each cycle.

Figure 20:
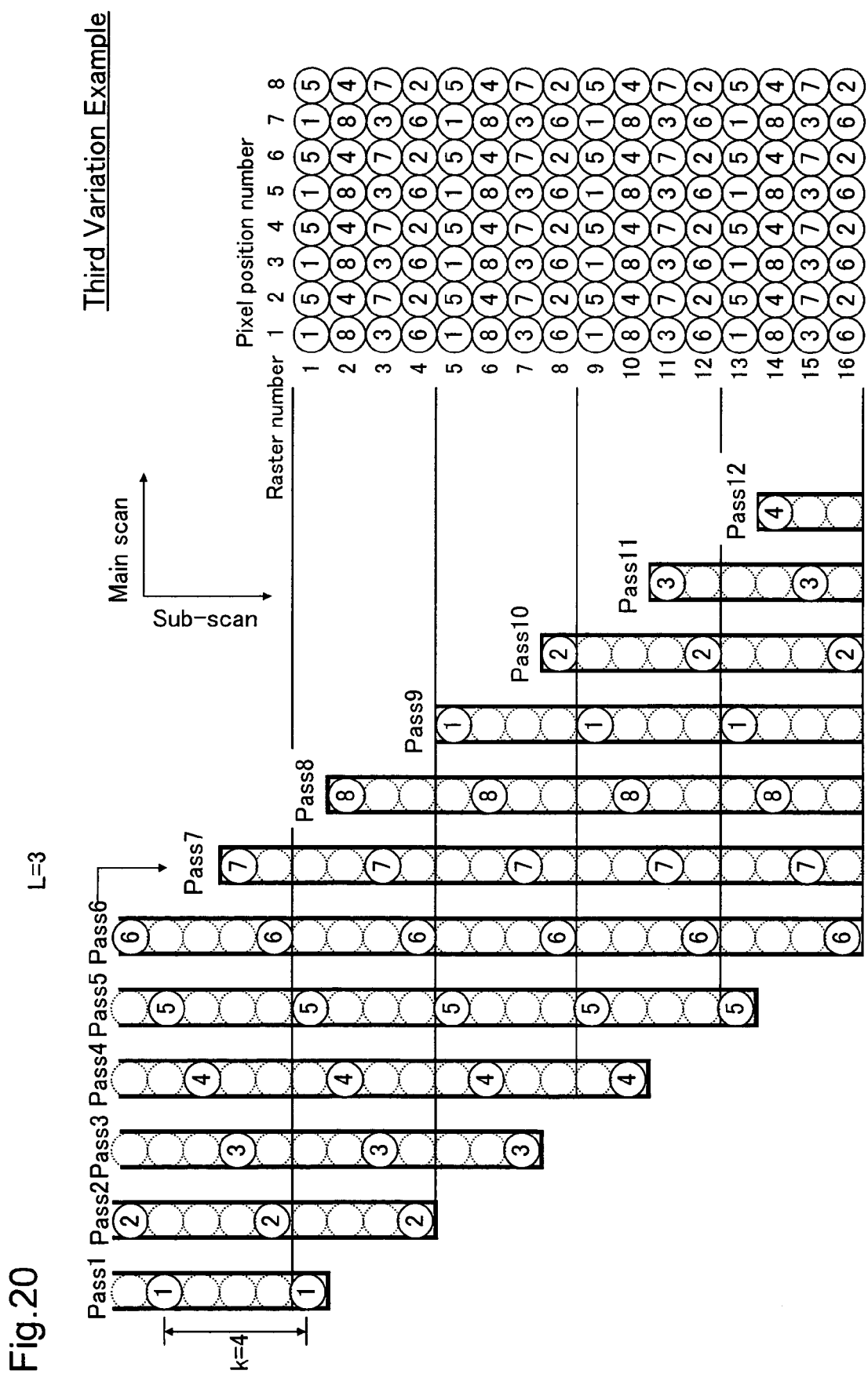
FIG. 20 is an explanatory drawing showing the printing status using the overlap recording method for the third variation example of the invention.

F-3. Third Variation Example:

FIG. 20 is an explanatory drawing showing the state of printing using an overlap recording method for the third variation example of the invention. In FIG. 20, the solid line circles including numbers indicate positions in the Sub-scan direction of six nozzles for each pass. The numbers 1 to 8 in the solid line circles are the number of remainders after dividing the pass number by 8. The pixel position number indicates the sequence of the arrangement of pixels on each raster line.

The overlap recording method is a recording method for which each raster line is formed by a plurality of passes. With the third variation example, each raster line is formed with two passes. In specific terms, for example, the raster line for which the raster number is 1 is formed by pass 1 and pass 5, and the raster lines 2 and 3 are respectively formed by pass 8 and pass 4, and pass 3 and pass 7.

As can be seen from FIG. 20, the dot pattern constituted by the raster lines for which the raster numbers are 1 to 4 are formed by eight passes of pass 1 to pass 8, and the dot pattern constituted by the raster lines for which the raster numbers are 5 to 8 are formed by eight passes of pass 3 to pass 10. Furthermore, when we focus on the number of remainders when the pass number is divided by 8, by repeating the dot pattern constituted by the dots formed on pixels 1 to 4 by the raster number and pixel position numbers 1 to 4, we can see that all the dot patterns are formed.

Figure 21:
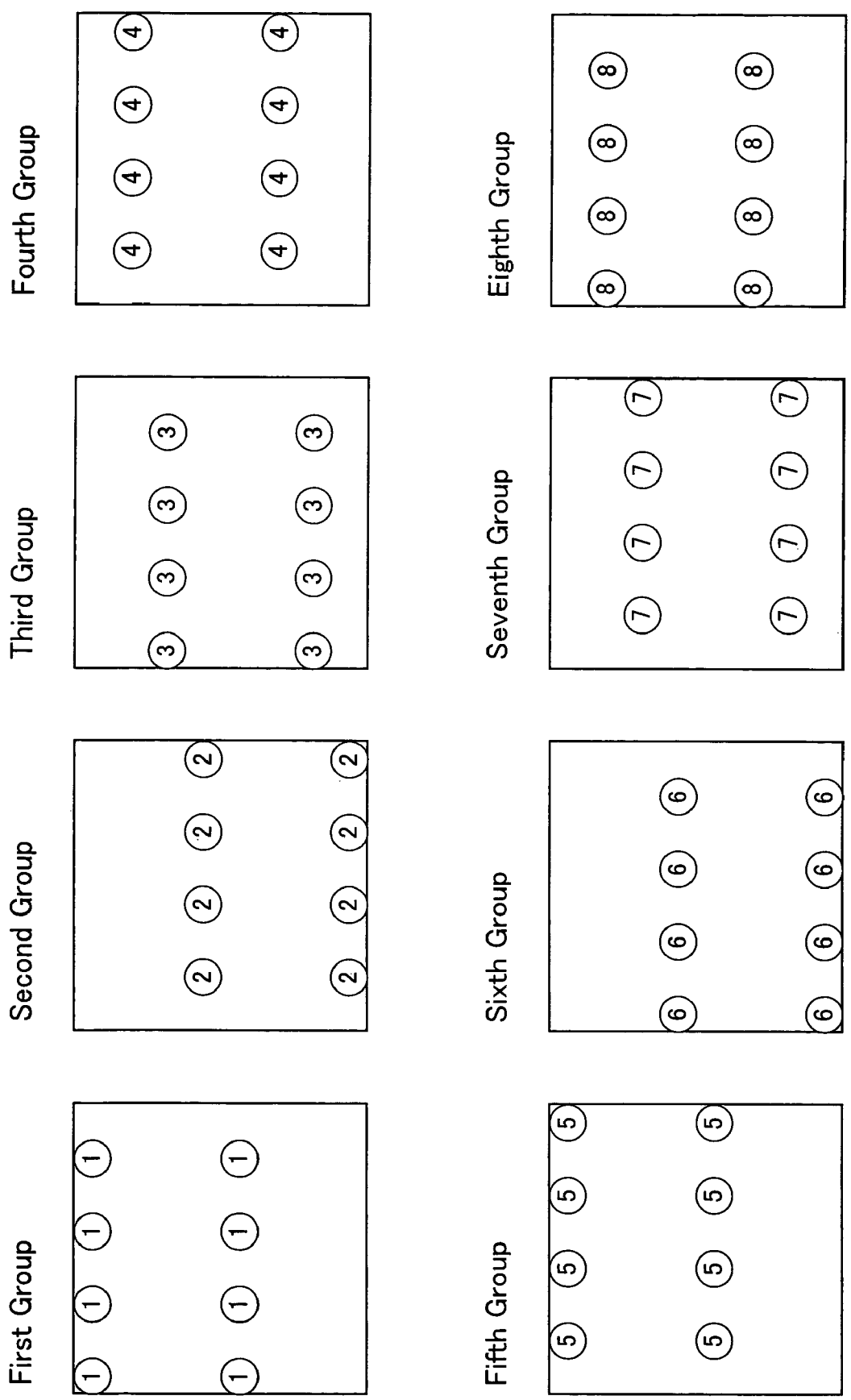
FIG. 21 is an explanatory drawing showing a group of eight pixel positions classified according to the number of remainders when the path number is divided by 8.

FIG. 21 is an explanatory drawing showing the eight pixel position groups divided according to the number of remainders when the pass number is divided by 8. With FIG. 21, each square shape indicates an image area constituted by pixels for which the pixel position number is 1 to 4 of the raster lines for which the raster number is 1 to 4. This image area correlates to the "shared printing area" in the patent claims, and is constituted by combining the print pixels belonging to each of the eight pixel position groups.

In this kind of case as well, the same phenomenon occurs as when there is mutual displacement of the dot positions formed with each pass, so it is possible to attempt to improve the image quality by performing the same process as the embodiments described above so that the dots formed by each of the eight pixel position groups has specified characteristics.

F-4. Fourth Variation Example:

FIG. 22 is an explanatory drawing showing an example of the actual printing state for the bidirectional printing method of the third variation example of the invention. The letters in the circles indicate which of the forward or backward main scans the dots were formed with. FIG. 22 (*a*) shows the dot pattern when displacement does not occur in the main scan direction.

FIG. 22 (*b*) and FIG. 22 (*c*) show the dot patterns when displacement does occur in the main scan direction.

With FIG. 22 (*b*), in relation to the position of dots formed at the print pixels belonging to the pixel position group for which dots are formed during the forward movement of the printing head, the position of the dots formed at the print pixels belonging to the pixel position group for which dots are formed during the backward scan of the printing head is shifted by 1 dot pitch in the rightward direction. Meanwhile, with FIG. 22 (*c*), in relation to the position of the dots formed at the print pixels belonging to the pixel position group for which dots are formed during the forward scan of the printing head, the position of the dots formed at the print pixels belonging to the pixel position group for which dots are formed during the backward scan of the printing head is shifted by 1 dot pitch in the leftward direction.

With the embodiments described above, by giving blue noise or green noise spatial frequency distribution to both the dot patterns of the pixel position group for which dots are formed during the forward scan and the dot patterns of the pixel position group for which dots are formed during the backward scan, image quality degradation due to this kind of displacement is suppressed.

In contrast to this, the third variation example is constituted so that the dot pattern for which the dot pattern formed on the pixel position group formed during the forward scan and the dot pattern formed on the pixel position group formed during the backward scan are shifted by 1 dot pitch in the main scan direction and synthesized has blue noise or green noise spatial frequency distribution, or has a small granularity index.

The constitution of the dither matrix focusing on the granularity index can be constituted so that, for example, the average value of the granularity index when the displacement in the main scan direction is shifted by 1 dot pitch in one direction, when it is shifted by 1 dot pitch in the other direction, and when it is not shifted, is a minimum. Alternatively, it is also possible to constitute this such that the spatial frequency distributions in these cases have a mutually high correlation coefficient.

Note that this variation example is able to increase the robustness level of the image quality in relation to displacement of the dot formation position during forward scan and backward scan, so it is possible to suppress the degradation of image quality not only in cases when the dot formation positions are shifted as a mass during the forward scan and the backward scan, but also when unspecified displacement occurs with part of the pixel position group for which dots are formed during the forward scan and the pixel position group for which dots are formed during the backward scan. For example, it is possible to suppress degradation of the image quality also in cases such as when there is partial variation in the gap of the printing head and the printing paper between the forward scan and the backward scan due to cyclical deformation due to the main scan of the main scan mechanism of the printing head, for example.

F-5.
This invention can also be applied to printing that performs printing using a plurality of printing heads. In specific terms, it is also possible to constitute this so that the spatial frequency distributions of dots formed in a plurality of pixel position groups in charge of dot formation by each of the plurality of printing heads have a mutually high correlation coefficient.

By working in this way, for printing using the plurality of printing heads, it is possible to constitute halftone processing with a high robustness level to displacement of dot formation positions between mutual printing heads, for example.

F-6.
With this invention, the inventors found not only robustness in relation to dot formation position misalignment, but also suppression of degradation of image quality due to the dot formation time sequence (or dot formation timing displacement).

Figure 23:
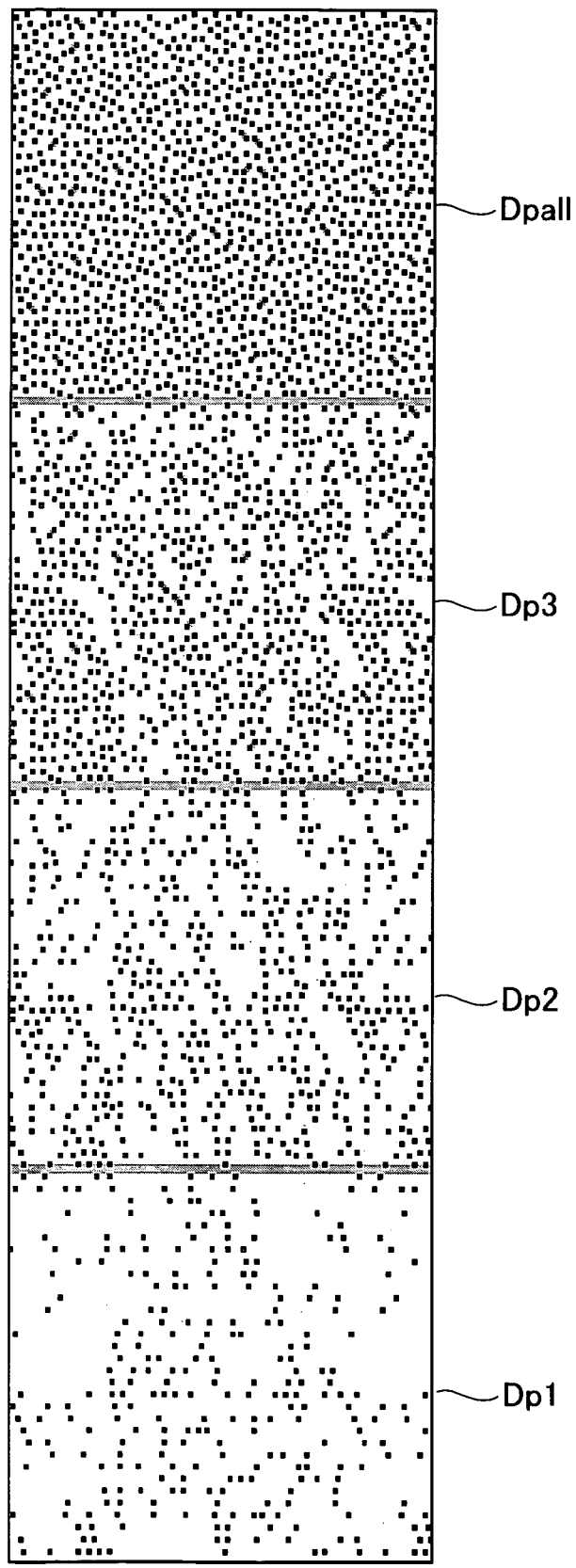
FIG. 23 is an explanatory drawing showing the state of the printing image being formed with mutually combining four pixel position groups in a common printing area in a case when conventional halftone processing was performed.

FIG. 23 is an explanatory drawing showing the state of print images being formed by mutually combining in a shared printing area four image groups in a case when conventional halftone processing is performed. FIG. 23 shows the dot patterns when the four to one pixel position groups are respectively combined.

With conventional halftone processing, processing is performed with a focus on the print image dot dispersion properties formed by all the pixel position groups, so as can be seen from FIG. 23, there is unevenness in the dot dispersion properties of each pixel position group. Specifically, a dense dot state occurs in the low frequency area. This kind of dense dot state causes a state of accumulation of ink drops, excessive sheen, and a bronzing phenomenon at the positions where the dot density is high, and causes image differences with positions at which dot density is low. This image difference causes the problem of it being easy for the human visual sense to recognize this as image unevenness.

This invention suppresses excessive high density of dots and reduces the states of accumulation of ink drops, excessive sheen, and the bronzing phenomenon, and causes uniformity for the overall print image, so it is able to suppress image unevenness. In this way, this invention is able to be applied broadly to printing that forms print images by mutually combining in a common print area print pixels belonging to each of a plurality of pixel position groups, and even if mutual displacement of dots formed in the plurality of pixel position groups is not assumed, it can be applied also in cases when there is a difference in timing of formation of dots formed in the plurality of pixel position groups. This invention generally can be applied in cases when, for dot formation, print pixels belonging to each of the plurality of pixel position groups for which a physical difference is assumed such as displacement of time or formation position are mutually combined in a common print area to form a print image.

F-7. With the embodiments described above, halftone processing was performed using a dither matrix, but it is also possible to use this invention in cases when halftone processing is performed using error diffusion, for example. Using error diffusion can be realized by having error diffusion processing performed for each of a plurality of pixel position groups, for example.

Note that with the dither method of the embodiments noted above, by comparing for each pixel the threshold values set in the dither matrix and the tone values of the image data, the presence or absence of dot formation is decided for each pixel, but it is also possible to decide the presence or absence of dot formation by comparing the threshold values and the sum of the tone values with a fixed value, for example. Furthermore, it is also possible to decide the presence or absence of dot formation according to the data generated in advance based on threshold value as and on the tone values without directly using the threshold values. The dither method of this invention generally can be a method that decides the presence or absence of dot formation according to the tone value of each pixel and the threshold value set for the pixel position corresponding to the dither matrix.

This invention also includes the following configuration as examples. With the printing apparatuses described above, it is also possible to have it so that the halftone process is constituted so that, at least for the tone level with relatively low dot density, the correlation coefficient between each of the spatial frequency distributions of the dot pattern formed on the print pixels belonging to each of the plurality of pixel position groups and the spatial frequency distribution of the print image is higher than any of the correlation coefficients between each of the spatial frequency distributions of dot patterns formed on print pixels belonging to each of any of the other plurality of the pixel position groups that form print images by mutually combining a common print area and the spatial frequency distribution of the print image, or the halftone process is constituted so that, at least for the tone level with relatively low dot density, the RMS granularity of the dot pattern formed on the print pixels belonging to each of the plurality of pixel position groups is lower than the RMS granularity of the dot pattern formed on the print pixels belonging to each of any of the other of the plurality of pixel position groups that form print images by mutually combining a common print area.

In this way, with this invention, it is acceptable as long as the optimality for the plurality of pixel position groups to be evaluated is compensated.

This invention further provides a printing apparatus with the following aspects. Specifically, a printing apparatus that prints images by forming dots both during forward scan and backward scan of the dot forming head, comprising: a dither matrix for which a threshold value is set for each pixel, dot formation presence or absence decision means that receives image data representing the tone value of each pixel constituting an image and decides the presence or absence of dot formation for each pixel according to the tone value of each of the pixels and to the threshold value set for the pixel position corresponding to the dither matrix, and dot forming means that forms dots based on the results of deciding the dot formation presence or absence, and the dither matrix is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

Also, the printing method of this invention corresponding to the printing apparatus noted above is a printing method that prints images by forming dots both during forward scan and backward scan of the dot forming head, comprising: a first step that stores the dither matrix for which the threshold values are set for each pixel, a second step that receives image data representing the tone value of each pixel constituting an image and decides the presence or absence of dot formation for each pixel according to the tone value of each of the pixels and to the threshold value set for the pixel position corresponding to the dither matrix, and a third step that forms dots based on the results of deciding the dot formation presence or absence, and the dither matrix stored at the first step is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

With the printing apparatus and printing method according to the invention of this application, the presence or absence of dot formation for each pixel is decided while referring to a dither matrix like the following. Specifically, each pixel position of the dither matrix can be classified as either a first pixel position or a second pixel position, and the matrix is such that the distribution of the threshold values set for the first pixel position and the distribution of the threshold values set for the second pixel position all have either blue noise characteristics or green noise characteristics. Here, the first pixel position and second pixel position means pixel positions having a relationship such that when forming dots while moving the dot forming head back and fort, with one of the pixel positions, dots are formed with either the forward scan or the backward scan, and with the other pixel position, dots are formed with the other. Note that just because it is said that each pixel position on the dither matrix can be classified as a first pixel or a second pixel position, doesn't necessarily mean that the direction for forming the dot of each pixel position is fixed to the forward scan or the backward scan.

Also, the distribution of the threshold values having blue noise characteristics means the following kind of distribution.

Specifically, when dots are generated using a dither matrix having that kind of threshold value distribution, dots are generated irregularly, and the spatial frequency component of the set threshold value means the distribution of a threshold value such as one having the biggest component in the high frequency range with one cycle as two pixels or less. Also, distribution of threshold values having green noise characteristics are distributions like the following. Specifically, when dots are generated using a dither matrix having that kind of threshold value distribution, dots are generated irregularly, and the spatial frequency component of the set threshold value means the distribution of a threshold value such as one having the biggest component in the medium frequency range with one cycle as from two pixels to ten or more pixels.

The detailed principle is described in detail later, but the degradation of image quality that occurs when the dot formation position is displaced between forward scan and backward scan when doing bidirectional printing can be greatly suppressed by suitably dispersing dots for both images made only with dots formed during the forward scan and images made only by dots formed during the backward scan. As is well known, using a dither matrix having blue noise characteristics or green noise characteristics, it is possible to suitably disperse dots if the presence or absence of dot formation is decided for each pixel. Therefore, if a dither matrix such as one having respectively blue noise characteristics or green noise characteristics is used for the distribution of threshold values set for the first pixel positions and distribution of threshold values set for the second pixel positions, it is possible to suitably disperse dots for both images made only with dots formed during the forward scan and images made only by dots formed during the backward scan, and thus, it is possible to suppress to a minimum the degradation of image quality when there is displacement of the dot formation positions.

Also, with this kind of printing apparatus, it is also possible to decide the presence or absence of dot formation for each pixel while referencing the following kind of dither matrix. Specifically, it is also possible to reference a dither matrix such as one for which, when the pixel positions of the matrix are classified into rasters that are pixel positions aligned in the direction in which the dot formation head moves back and forth, only one or the other of the first pixel position or the second pixel position is contained within one of the rasters.

By working in this way, even if there is dot formation position misalignment between the dot formation head forward scan and backward scan, within the same raster, dots are formed only of one or the other of the forward scan or backward scan, and the distance between dots does not come too close or too far, so it is possible to suppress degradation of the image quality.

Also, with this kind of dither matrix, it is also possible to align rasters containing only first pixel positions and rasters containing only second pixel positions alternately in a direction intersecting with the raster.

By working in this way, with dots formed during forward scan and dots formed during backward scan, even if the dot formation positions are displaced, the dots are displaced in one direction over consecutive rasters, and it is possible to avoid this from being visible and degrading the image quality.

Also, the printing apparatus described above forms dots based on the presence or absence of dot formation decided for each pixel, and when the presence or absence of dot formation for each pixel is decided, if the focus is on deciding this by referencing a dither matrix having specified characteristics, the invention of this application can also be understood as the following kind of image processing device and image processing method. Specifically, the image processing device of the invention of this application is an image processing device that generates control data used for a printing apparatus that prints images by forming dots both during forward scan and backward scan of the dot forming head to control the dot formation, comprising: a dither matrix for which threshold values are set for each pixel, dot formation presence or absence decision means that receives image data representing the tone value of each pixel constituting an image and decides the presence or absence of dot formation for each pixel according to the tone value of each of the pixels and to the threshold value set for the pixel position corresponding to the dither matrix, and control data output means that outputs the results of deciding the dot formation presence or absence as the control data, and the dither matrix is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

The method of generating this kind of dither matrix is a method of generating a dither matrix for printing that forms a print image by mutually combining in a common print area the print pixels belonging to each of the plurality of pixel position groups for which physical differences are assumed during dot formation, comprising: setting of the evaluation function that sets the evaluation function for calculating the evaluation value of the dither matrix, preparing that prepares a dither matrix as the initial state for storing in each element a plurality of threshold values for deciding the presence or absence of dot formation for each pixel according to the input tone value, deciding of the storage elements that, while replacing part of the plurality of threshold values stored in each element with threshold values stored in other elements, decides the elements in which each threshold value is stored, and outputting of a dither matrix for which the storage element is decided for all of the plurality of threshold values, the deciding of the storage element including: mutual replacing of part of the plurality of threshold values, calculating of the evaluation value of the dither matrix for which the threshold value was replaced using the evaluation function, and deciding of the storage element for the plurality of threshold values according to conformity to a specified criterion of the evaluation value, and the evaluation function is constituted based on the characteristics of the dot pattern formed on the print pixels belonging to each of the plurality of pixel position groups at least for the tone level with relatively low dot density.

For the dither matrix generating method noted above, it is preferable that the evaluation function be set to be the RMS granularity of the dot pattern formed on the print pixels belonging to each of the plurality of pixel position groups for at least the part of the gradations for which the dot density is relatively low.

The RMS granularity is an objective measure representing variation in the dot denseness, and it is capable of doing simple calculation simply with a smoothing process using a smoothing filter set according to the resolution and with calculation of the standard deviation of the dot formation density, so it is very suitable for optimization processing which involves many calculation repetitions. In addition, use of RMS granularity is because it has the advantage of it being possible to do flexible processing considering human visual sense and visual environment according to the design of the smoothing filter in comparison to a fixed process using the human visual sense characteristic VTF.

This kind of dither matrix generating method is a method of generating a dither matrix for printing that forms a print image by mutually combining in a common print area the print pixels belonging to each of the plurality of pixel position groups for which physical differences are assumed during dot formation, comprising: setting of the evaluation function that sets the evaluation function for calculating the evaluation value of the dither matrix, preparing that prepares a dither matrix as the initial state for storing in each element a plurality of threshold values for deciding the presence or absence of dot formation for each pixel according to the input tone value, deciding of the storage elements that, while replacing part of the plurality of threshold values stored in each element with threshold values stored in other elements, decides the elements in which each threshold value is stored, and outputting of a dither matrix for which the storage element is decided for all of the plurality of threshold values, the deciding of the storage element including: mutual replacing of part of the plurality of threshold values, calculating of the overall evaluation value that is the evaluation value of the dither matrix for which the threshold value was replaced using the evaluation function, and deciding of the storage element for the plurality of threshold values according to conformity to a specified criterion of the overall evaluation value and each of the group evaluation values.

Also, the image processing method of this invention corresponding to the image processing device noted above is an image processing method that generates control data used for a printing apparatus that prints images by forming dots both during forward scan and backward scan of the dot forming head to control the dot formation, comprising: step (A) that stores the dither matrix for which threshold values are set for each pixel, step (B) that receives image data representing the tone value of each pixel constituting an image and decides the presence or absence of dot formation for each pixel according to the tone value of each of the pixels and to the threshold value set for the pixel position corresponding to the dither matrix, and step (C) that outputs the results of deciding the dot formation presence or absence as the control data, and the dither matrix stored at the step (A) is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

For this image processing device and image processing method as well, the same as with the previously describe printing apparatus and printing method, when deciding the presence or absence of dot formation for each pixel, the following kind of dither matrix is referenced. Specifically, referenced is a matrix such as one for which each of the pixel positions of the dither matrix can be classified as either a first pixel position or a second pixel position, and both the distribution of the threshold values set for the first pixel position and the distribution of the threshold values set for the second pixel position have either blue noise characteristics or green noise characteristics. When an image is printed using control data generated referencing this kind of dither matrix, even if the dot formation positions are displaced between the dot formation head forward scan and backward scan, it is possible to suppress to a minimum the degradation of the image quality due to that, and to print a high image quality image.

Furthermore, the invention of this application can also be realized using a computer by reading into a computer a program for realizing the printing method or the image processing method described above. Therefore, this invention also includes aspects as the following kind of program or as a recording medium on which is recorded the program. Specifically, the program of the invention of this application corresponding to the printing method described above is a program that realizes using a computer a method that prints images by forming dots both during forward scan and backward scan of the dot forming head, realizing using the computer: a first function that stores the dither matrix for which threshold values are set for each pixel, a second function that receives image data representing the tone value of each pixel constituting an image and decides the presence or absence of dot formation for each pixel according to the tone value of each of the pixels and to the threshold value set for the pixel position corresponding to the dither matrix, and a third function that forms dots based on the results of deciding the dot formation presence or absence, and the dither matrix stored by the first function is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

Also, the recording medium of the invention of this application corresponding to the program noted above is a recording medium on which is recorded a computer readable program that prints images by forming dots both during forward scan and backward scan of the dot formation head, recording functions realized using the computer of: a first function that stores the dither matrix for which threshold values are set for each pixel, a second function that receives image data representing the tone value of each pixel constituting an image and decides the presence or absence of dot formation for each pixel according to the tone value of each of the pixels and to the threshold value set for the pixel position corresponding to the dither matrix, and a third function that forms dots based on the results of deciding the dot formation presence or absence, and the dither matrix stored by the first function is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

Also, the program of the invention of this application corresponding to the image processing method described above is a program that realizes using a computer a method that generates control data used for a printing apparatus that prints images by forming dots both during forward scan and backward scan of the dot forming head to control the dot formation, realizing using the computer: function (A) that stores the dither matrix for which threshold values are set for each pixel, function (B) that receives image data representing the tone value of each pixel constituting an image and decides the presence or absence of dot formation for each pixel according to the tone value of each of the pixels and to the threshold value set for the pixel position corresponding to the dither matrix, and function (C) that outputs the results of deciding the dot formation presence or absence as the control data, and the dither matrix stored by the function (A) is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

Also, the recording medium of the invention of this application corresponding to the program noted above is a recording medium on which is recorded to be readable on the computer a program that generates control data used for a printing apparatus that prints images by forming dots both during forward scan and backward scan of the dot forming head to control the dot formation, recording a program realized using the computer of: function (A) that stores the dither matrix for which threshold values are set for each pixel, function (B) that receives image data representing the tone value of each pixel constituting an image and decides the presence or absence of dot formation for each pixel according to the tone value of each of the pixels and to the threshold value set for the pixel position corresponding to the dither matrix, and function (C) that outputs the results of deciding the dot formation presence or absence as the control data, and the dither matrix stored by the function (A) is a matrix having either blue noise characteristics or green noise characteristics for both threshold value distribution set for the first pixel position group used for deciding the presence or absence of dot formation for the pixels for which dots are formed with either the forward scan or the backward scan of the dot forming head, and the threshold value distribution set for the second pixel position group excluding the first pixel position group from the dither matrix.

If this kind of program or program recorded on a recording medium is read into a computer and the various functions described above are realized using the computer, even when the dot formation positions are displaced between the dot formation head forward scan and backward scan, it is possible to suppress to a minimum the effect due to this. Because of this, it is possible to rapidly print high image quality images and also possible to simplify the mechanism and control for adjusting the dot formation position with the forward scan and backward scan.

Finally, the present application claims the priority based on Japanese Patent Application No. 2005-032771 filed on Feb. 9th 2005, Japanese Patent Application No. 2005-171290 filed on Jun. 10th 2005, Japanese Patent Application No. 2005-210792 filed on Jul. 21, 2005, which are herein incorporated by reference.

What is claimed is:

1. A printing apparatus that performs printing on a print medium, comprising:
 a dot data generator that performs a halftone process on image data representing a tone value of each of pixels constituting an original image to determine a status of dot formation on each of print pixels of a print image to be formed on the print medium, for generating dot data representing the determined status of dot formation, and
 a print image generator that forms a dot on each of the print pixels for generating the print image according to the dot data, wherein
 the print image generator is configured to generate the print image by mutually combining dots formed on print pixels belonging to each of a plurality of pixel position groups in a common print area,
 the print image generator has a printing head and generates the print image by forming dots on each of the print pixels during forward scan and backward scan of the printing head, while performing a main scan of the printing head,
 the plurality of pixel position groups includes a first pixel position group for which dots are formed during the forward scan of the printing head and a second pixel position group for which dots are formed during the backward scan of the printing head,
 the dot data generator is set such that the halftone process is configured to provide each of dot patterns with a predetermined characteristic, each of the dot patterns including dot patterns formed on the print pixels belonging to each of the plurality of pixel position groups,
 the predetermined characteristic is either one of blue noise characteristics and green noise characteristics, and
 the halftone process is configured such that any first correlation coefficients are higher than any of second correlation coefficients at least for tone levels with relatively low dot density, wherein
 the first correlation coefficients are coefficients between each of spatial frequency distributions of the dot patterns formed on the print pixels belonging to each of the plurality of pixel position groups and spatial frequency distribution of the print image, and
 the second correlation coefficients are correlation coefficients between each of spatial frequency distributions of dot patterns formed on print pixels belonging to each of any of other plurality of the pixel position groups that form print images by mutually combining in a common print area and the spatial frequency distribution of the print image.

2. The printing apparatus according to claim 1, wherein the halftone process is further configured to provide a hypothetical print image on an assumption of none of the relative shift of dot position with the predetermined characteristic.

3. The printing apparatus according to claim 1, wherein the halftone process is further configured to provide both of a plurality of hypothetical print images with the predetermined characteristic, the plurality of hypothetical print images including a first hypothetical print image on an assumption of the relative shift of dot position and a second hypothetical print image on an assumption of none of the relative shift of dot position.

4. The printing apparatus according to claim 1, wherein the print image generator generates the print image by forming dots on each of the print pixels while repeating a main scan cycle of the printing head N times (N is an integer of 2 or more), according to the dot data, and the plurality of pixel position groups includes a plurality of pixel position groups divided according to a remainder from a numerical value representing an order of a sub-scan direction of the main scan line divided by the aforementioned N.

5. The printing apparatus according to claim 1, wherein the print image generator has a plurality of printing heads and generates the print image by forming dots on each of the print pixels according to the dot data, while performing a main scan of the plurality of printing heads, and the plurality of pixel position groups includes a plurality of pixel position groups for which each of the plurality of printing heads in charge of the dot formation of each of the plurality of pixel position groups.

6. The printing apparatus according to claim 1, wherein the print image generator has a plurality of printing heads and generates the print image by forming dots on each of the print pixels according to the dot data, while performing a sub-scan of the print medium, and the plurality of pixel position groups includes a plurality of pixel position groups for which each of the plurality of printing heads in charge of the dot formation of each of the plurality of pixel position groups.

* * * * *